(12) United States Patent
Wright et al.

(10) Patent No.: US 6,601,027 B1
(45) Date of Patent: Jul. 29, 2003

(54) POSITION MANIPULATION IN SPEECH RECOGNITION

(75) Inventors: Barton D. Wright, Newton, MA (US); Joev Dubach, Watertown, MA (US); David W. Parmenter, Newton, MA (US); Allan Gold, Acton, MA (US); Jonathan Hood Young, Newtonville, MA (US); Joel M. Gould, Winchester, MA (US)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/094,611

(22) Filed: Jun. 15, 1998

Related U.S. Application Data

(63) Continuation-in-part of application No. 08/825,534, filed on Mar. 28, 1997, now Pat. No. 6,064,959, and a continuation-in-part of application No. 08/559,207, filed on Nov. 13, 1995, now Pat. No. 5,799,279.

(51) Int. Cl.[7] ............................ G10L 15/22; G10L 15/26
(52) U.S. Cl. ........................ 704/235; 704/251; 704/275
(58) Field of Search ............................ 704/231, 235, 704/251, 254, 255, 257, 275, 270

(56) References Cited

U.S. PATENT DOCUMENTS

| | | | |
|---|---|---|---|
| 4,355,302 A | | 10/1982 | Aldefeld et al. |
| 4,566,065 A | * | 1/1986 | Toth ............................ 704/251 |
| 4,674,065 A | | 6/1987 | Lange et al. |
| 4,726,065 A | * | 2/1988 | Froessl ....................... 704/275 |
| 4,783,803 A | | 11/1988 | Baker et al. |
| 4,805,218 A | | 2/1989 | Bamberg et al. |
| 4,805,219 A | | 2/1989 | Baker et al. |
| 4,829,576 A | | 5/1989 | Porter |
| 4,833,712 A | | 5/1989 | Bahl et al. |
| 4,866,778 A | | 9/1989 | Baker |
| 4,914,704 A | | 4/1990 | Cole et al. |
| 4,931,950 A | | 6/1990 | Isle et al. |
| 4,959,864 A | | 9/1990 | Van Nes et al. |
| 5,027,406 A | * | 6/1991 | Roberts et al. ............. 704/244 |
| 5,031,217 A | | 7/1991 | Nishimura |
| 5,033,087 A | | 7/1991 | Bahl et al. |
| 5,036,538 A | | 7/1991 | Oken et al. |
| 5,127,055 A | * | 6/1992 | Larkey ....................... 704/244 |
| 5,202,952 A | | 4/1993 | Gillick et al. |
| 5,231,670 A | | 7/1993 | Goldhor et al. |
| 5,329,609 A | | 7/1994 | Sanada et al. |
| 5,377,303 A | | 12/1994 | Firman |
| 5,384,892 A | | 1/1995 | Strong |
| 5,386,494 A | | 1/1995 | White |
| 5,398,220 A | | 3/1995 | Barker ....................... 704/270 |
| 5,428,707 A | | 6/1995 | Gould et al. |
| 5,477,511 A | * | 12/1995 | Englehardt ................. 704/235 |
| 5,491,774 A | * | 2/1996 | Norris et al. ............... 379/215 |
| 5,497,373 A | | 3/1996 | Hulen et al. |
| 5,632,002 A | | 5/1997 | Hashimoto et al. |
| 5,754,972 A | | 5/1998 | Baker et al. |
| 5,765,132 A | | 6/1998 | Roberts |
| 5,794,189 A | * | 8/1998 | Gould et al. ............... 704/231 |
| 5,799,279 A | * | 8/1998 | Gould et al. ............... 704/275 |
| 5,875,429 A | * | 2/1999 | Douglas ..................... 704/275 |
| 6,064,959 A | * | 5/2000 | Young et al. .............. 704/251 |
| 6,085,159 A | * | 7/2000 | Ortega et al. .............. 704/235 |
| 6,138,098 A | * | 10/2000 | Shieber et al. ............. 704/257 |
| 6,167,377 A | * | 12/2000 | Gillick et al. ............... 704/240 |
| 6,212,498 B1 | * | 4/2001 | Sherwood et al. .......... 704/244 |
| 6,424,943 B1 | * | 7/2002 | Sherwood et al. .......... 704/244 |

FOREIGN PATENT DOCUMENTS

EP   0 785 540 A2   7/1997

OTHER PUBLICATIONS

"Dragon NaturallySpeaking™ Professional", Getting Started, XP–002116949; Chapters 1–4, ppg. 1–83. 1998.

* cited by examiner

*Primary Examiner*—Marsha D. Banks-Harold
*Assistant Examiner*—Martin Lerner
(74) *Attorney, Agent, or Firm*—Fish & Richardson P.C.

(57) ABSTRACT

An action position is manipulated in computer-implemented speech recognition by receiving data representing a spoken command. The command includes a command identifier (e.g., insert before, insert after, resume with) and a designation of at least one previously-spoken word. Speech recognition is performed on the data to identify the command identifier and the designation. Finally, an action position is established relative to the previously-spoken word based on the command identifier. Text may be selected using a spoken selection command that includes a command identifier and a text block identifier identifying a block of previously-recognized text. At least one word included in the block of text is not included in the text block identifier.

39 Claims, 29 Drawing Sheets

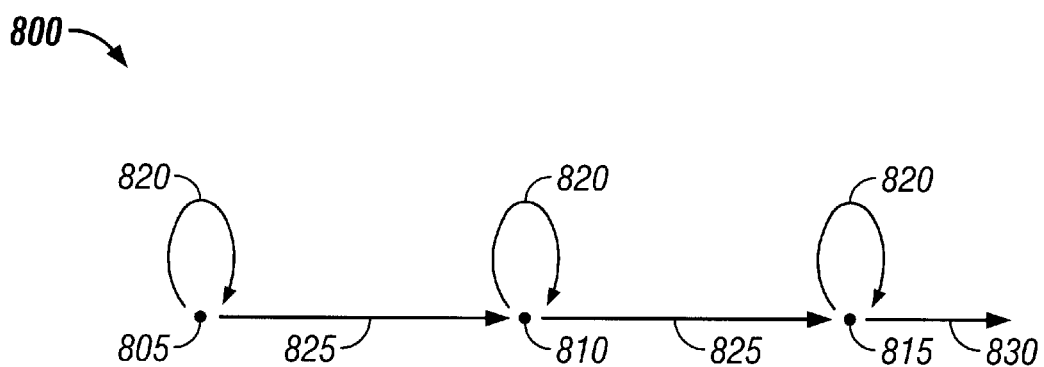
FIG. 8A
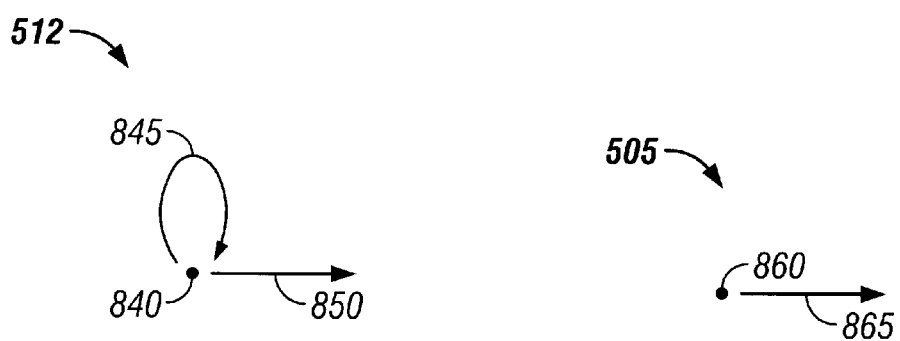 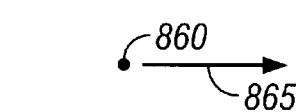
FIG. 8B  FIG. 8C

| FRAME | 840 ("A") | 805 ("B") | 810 ("C") | 815 ("D") | NEXT NODE ("N") |
|---|---|---|---|---|---|
| 900-0 | 0 | ---- | ---- | ---- | ---- |
| 905-1 | $S_{A1} = A_{A1}$ | $S_{B1} = A_{B1}$ | ---- | ---- | ---- |
| 910-2 | $S_{A2} = S_{A1} + A_{A2}$ | $S_{B2} = MIN(S_{B1} + STAY_B, S_{A1}) + A_{B2}$ | $S_{C2} = S_{B1} + LEAVE_B + A_{C2}$ | ---- | ---- |
| 915-3 | $S_{A3} = S_{A2} + A_{A3}$ | $S_{B3} = MIN(S_{B2} + STAY_B, S_{A2}) + A_{B3}$ | $S_{C3} = MIN(S_{C2} + STAY_C, S_{B2} + LEAVE_B) + A_{C3}$ | $S_{D3} = S_{C2} + LEAVE_C + A_{D3}$ | ---- |
| 920-4 | $S_{A4} = S_{A3} + A_{A4}$ | $S_{B4} = MIN(S_{B3} + STAY_B, S_{A3}) + A_{B4}$ | $S_{C4} = MIN(S_{C3} + STAY_C, S_{B3} + LEAVE_B) + A_{C4}$ | $S_{D4} = MIN(S_{D3} + STAY_D, S_{C3} + LEAVE_C) + A_{D4}$ | $S_{N4} = S_{D2} + LEAVE_D + A_{D4}$ |
| 925-n | $S_{An} = S_{An-1} + A_{An}$ | $S_{Bn} = MIN(S_{Bn-1} + STAY_B, S_{An-1}) + A_{Bn}$ | $S_{Cn} = MIN(S_{Cn-1} + STAY_C, S_{Bn-1} + LEAVE_B) + A_{Cn}$ | $S_{Dn} = MIN(S_{Dn-1} + STAY_D, S_{Cn-1} + LEAVE_C) + A_{Dn}$ | $S_{Nn} = MIN(S_{Nn-1} + STAY_M, S_{Mn-1} + LEAVE_M) + A_{Nm}$ |

FIG. 9

| FRAME | 810 ("A") | 805 ("B") | 810 ("C") | 815 ("D") | NEXT NODE ("N") |
|---|---|---|---|---|---|
| 900-0 | $S_{A0}=0$ | ----- | ----- | ----- | ----- |
| 905-1 | $S_{A1}=F(S_{A0},A_{A1})$ | $S_{B1}=F(S_{A0},A_{B1})$ | ----- | ----- | ----- |
| 910-2 | $S_{A2}=F(S_{A1},A_{A2})$ | $S_{B2}=F(S_{B1},STAY_B,S_{A1},A_{B2})$ | $S_{C2}=F(S_{B1},LEAVE_B,A_{C2})$ | ----- | ----- |
| 915-3 | $S_{A3}=F(S_{A2},A_{A3})$ | $S_{B3}=F(S_{B2},STAY_B,S_{A2},A_{B3})$ | $S_{C3}=F(S_{C2},STAY_C,S_{B2},LEAVE_B,A_{C3})$ | $S_{D3}=F(S_{C2},LEAVE_C,A_{D3})$ | ----- |
| 920-4 | $S_{A4}=F(S_{A3},A_{A4})$ | $S_{B4}=F(S_{B3},STAY_B,S_{A3},A_{B4})$ | $S_{C4}=F(S_{C3},STAY_C,S_{B3},LEAVE_B,A_{C4})$ | $S_{D4}=F(S_{D3},STAY_D,S_{C3},LEAVE_C,A_{D4})$ | $S_{N4}=F(S_{D3},LEAVE_D,A_{D3})$ |
| 925-n | $S_{An}=F(S_{An-1},A_{An})$ | $S_{Bn}=F(S_{Bn-1},STAY_B,S_{An-1},A_{Bn})$ | $S_{Cn}=F(S_{Cn-1},STAY_C,S_{Bn-1},LEAVE_B,A_{Cn})$ | $S_{Dn}=F(S_{Dn-1},STAY_D,S_{Cn-1},LEAVE_C,A_{Dn})$ | $S_{Nn}=F(S_{Dn-1},LEAVE_N,A_{Nn})$ |

FIG. 10

POSITION MANIPULATION IN SPEECH RECOGNITION

CROSS-REFERENCE TO RELATED APPLICATIONS

This application is a continuation-in-part of Ser. No. 08/559,207 filed Nov. 13, 1995, and claims priority under 35 U.S.C. §120 to U.S. Pat. No. 5,799,279, issued Aug. 25, 1998, and Ser. No. 08/825,534 filed Mar. 28, 1997, and U.S. Pat. No. 6,064,959, issued May 16, 2000.

TECHNICAL FIELD

The invention relates to position manipulation in speech recognition.

BACKGROUND

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A continuous speech recognition system can recognize spoken words or phrases regardless of whether the user pauses between them. By contrast, a discrete speech recognition system recognizes discrete words or phrases and requires the user to pause briefly after each discrete word or phrase. Continuous speech recognition systems typically have a higher incidence of recognition errors in comparison to discrete recognition systems due to complexities of recognizing continuous speech. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

In general, the processor of a continuous speech recognition system analyzes "utterances" of speech. An utterance includes a variable number of frames and may correspond to a period of speech followed by a pause of at least a predetermined duration.

The processor determines what the user said by finding acoustic models that best match the digital frames of an utterance, and identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

The words or phrases corresponding to the best matching acoustic models are referred to as recognition candidates. The processor may produce a single recognition candidate (i.e., a single sequence of words or phrases) for an utterance, or may produce a list of recognition candidates.

Correction mechanisms for previous discrete speech recognition systems displayed a list of choices for each recognized word and permitted a user to correct a misrecognition by selecting a word from the list or typing the correct word. For example, DragonDictate® for Windows®, available from Dragon Systems, Inc. of Newton, Mass., displayed a list of numbered recognition candidates ("a choice list") for each word spoken by the user, and inserted the best-scoring recognition candidate into the text being dictated by the user. If the best-scoring recognition candidate was incorrect, the user could select a recognition candidate from the choice list by saying "choose-N", where "N" was the number associated with the correct candidate. If the correct word was not on the choice list, the user could refine the list, either by typing in the first few letters of the correct word, or by speaking words (e.g., "alpha", "bravo") associated with the first few letters. The user also could discard the incorrect recognition result by saying "scratch that".

Dictating a new word implied acceptance of the previous recognition. If the user noticed a recognition error after dictating additional words, the user could say "Oops", which would bring up a numbered list of previously-recognized words. The user could then choose a previously-recognized word by saying "word-N", where "N" is a number associated with the word. The system would respond by displaying a choice list associated with the selected word and permitting the user to correct the word as described above.

SUMMARY

In one general aspect, an action position in computer-implemented speech recognition is manipulated in response to received data representing a spoken command. The command includes a command identifier and a designation of at least one previously-spoken word. Speech recognition is performed on the data to identify the command identifier and the designation. Thereafter, an action position is established relative to the previously-spoken word based on the command identifier.

Implementations may include one or more of the following features. The designation may include a previously-spoken word or words, or may include a shorthand identifier for a previously-spoken selection or utterance (e.g., "that").

The command identifier may indicate that the action position is to be before (e.g., "insert before") or after (e.g., "insert after") the previously-spoken word, words, or utterance. When this is the case, the action position may be established immediately prior to, or immediately following, the previously-spoken word, words, or utterance.

The designation may include one or more previously-spoken words and one or more new words. In this case, any words following the previously-spoken words included in the command may be replaced by the new words included in the command. The action position then is established after the new words. This command may be implemented, for example, as a "resume with" command in which the words "resume with" are followed by one or more previously-recognized words and one or more new words.

The "resume with" command does not rely on the presentation of information on the display. For that reason, the command is particularly useful when the user records speech using a portable recording device, such as an analog or digital recorder, and subsequently transfers the recorded speech to the speech recognition system for processing. In that context, the "Resume With" command provides the user with a simple and efficient way of redirecting the dictation and eliminating erroneously-spoken words.

The data representing the command may be generated by recording the command using a recording device physically separate from a computer implementing the speech recognition. When the recording device is a digital recording device, the data may be in the form of a file generated by the digital recording device. The data also may be in the form of signals generated by playing back the spoken command using the recording device, such as when an analog recording device is used.

In another general aspect, a block of text is selected in computer-implemented speech recognition in response to data representing a spoken selection command. The command includes a command identifier and a text block identifier identifying a block of previously-recognized text. At least one word included in the block of text is not included in the text block identifier. Speech recognition is performed on the data to identify the command identifier and the text block identifier. Thereafter, the block of text corresponding to the text block identifier is selected.

Implementations may include one or more of the following features. The text block identifier may include at least a first previously-recognized word of the block of text and at least a last previously-recognized word of the block of text. For example, the command identifier may be "select" and the text block identifier may include the first previously-recognized word of the block of text, "through", and the last previously-recognized word of the block of text (i.e., "select X through Y"). Alternatively, the text block identifier may be a shorthand notation (e.g., "that") for a previously-spoken selection or utterance.

Speech recognition may be performed using a constraint grammar. The constraint grammar may permit the block of text to start with any word in a set of previously-recognized words and to end with any word in the set of previously-recognized words. The set of previously-recognized words may include previously-recognized words displayed on a display device when the selection command is spoken.

Performing speech recognition may include generating multiple candidates for the text block identifier, and eliminating candidates for which the block of text starts with a previously-recognized word spoken after a previously-recognized word with which the block of text ends.

Performing speech recognition may include associating a score with each of the multiple candidates. Generally, a score for a candidate is based on scores for components of the candidate. When components of different candidates are homophones, the scores for the candidates may be adjusted so that the portion of each score attributable to one of the homophones equals the score of the best-scoring one of the homophones.

In another general aspect, a computer-based technique for use in working with text includes receiving a command including an utterance designating a portion of the text, performing speech recognition on the utterance to identify the portion of the text, and establishing an action position in the text at a location relative to the identified portion of the text the location being determined by the command.

Other features and advantages will be apparent from the following description, including the drawings, and from the claims.

DESCRIPTION OF DRAWINGS

FIGS. 8A, 8B and 8C are state graphs representing nodes of the lexical tree of FIG. 5.

FIGS. 9 and 10 are charts of scores corresponding to the states of the state graphs of FIGS. 8A, 8B and 8C.

DETAILED DESCRIPTION

Figure 1:
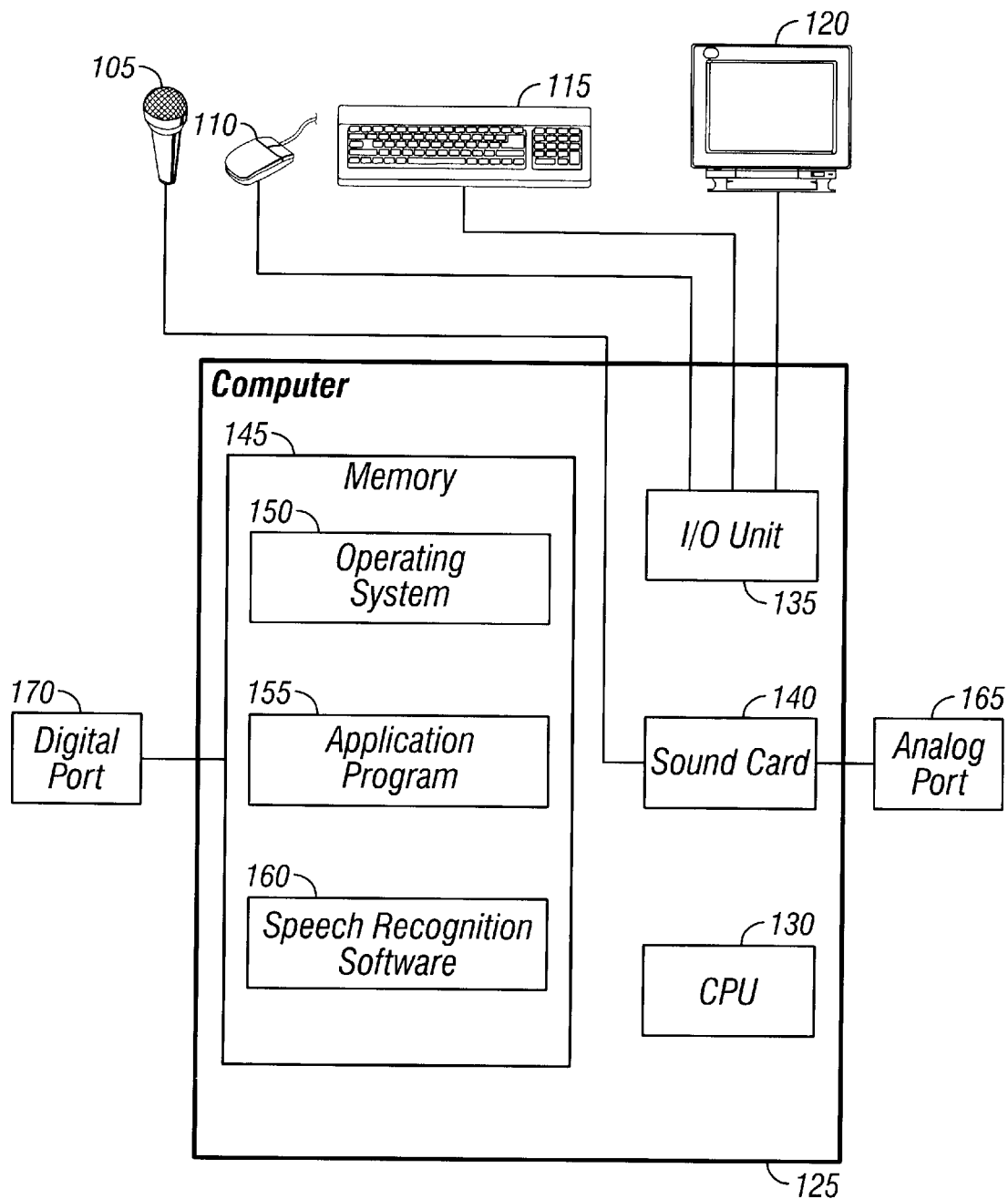
FIG. 1 is a block diagram of a speech recognition system.

Referring to FIG. 1, a speech recognition system 100 includes input/output (I/O) devices (e.g., microphone 105, mouse 110, keyboard 115, and display 120) and a general purpose computer 125 having a processor 130, an I/O unit 135 and a sound card 140. A memory 145 stores data and programs such as an operating system 150, an application program 155 (e.g., a word processing program), and speech recognition software 160.

The microphone 105 receives the user's speech and conveys the speech, in the form of an analog signal, to the sound card 140, which in turn passes the signal through an analog-to-digital (A/D) converter to transform the analog signal into a set of digital samples. Under control of the operating system 150 and the speech recognition software 160, the processor 130 identifies utterances in the user's continuous speech. Utterances are separated from one another by a pause having a sufficiently-large, predetermined duration (e.g., 160–250 milliseconds). Each utterance may include one or more words of the user's speech.

The system also may include an analog recorder port 165 and/or a digital recorder port 170. The analog recorder port 165 is connected to the sound card 140 and is used to transmit speech recorded using a handheld recorder to the sound card. The analog recorder port may be implemented as a microphone positioned so as to be next to the speaker of the handheld recorder when the recorder is inserted into the port 165, and also may be implemented using the microphone 105. Alternatively, the analog recorder port 165 may be implemented as a tape player that receives a tape recorded using a handheld recorder and transmits information recorded on the tape to the sound card 140.

The digital recorder port 170 may be implemented to transfer a digital file generated using a handheld digital recorder. This file may be transferred directly into memory 145. The digital recorder port 170 may be implemented as a storage device (e.g., a floppy drive) of the computer 125.

Figure 2:
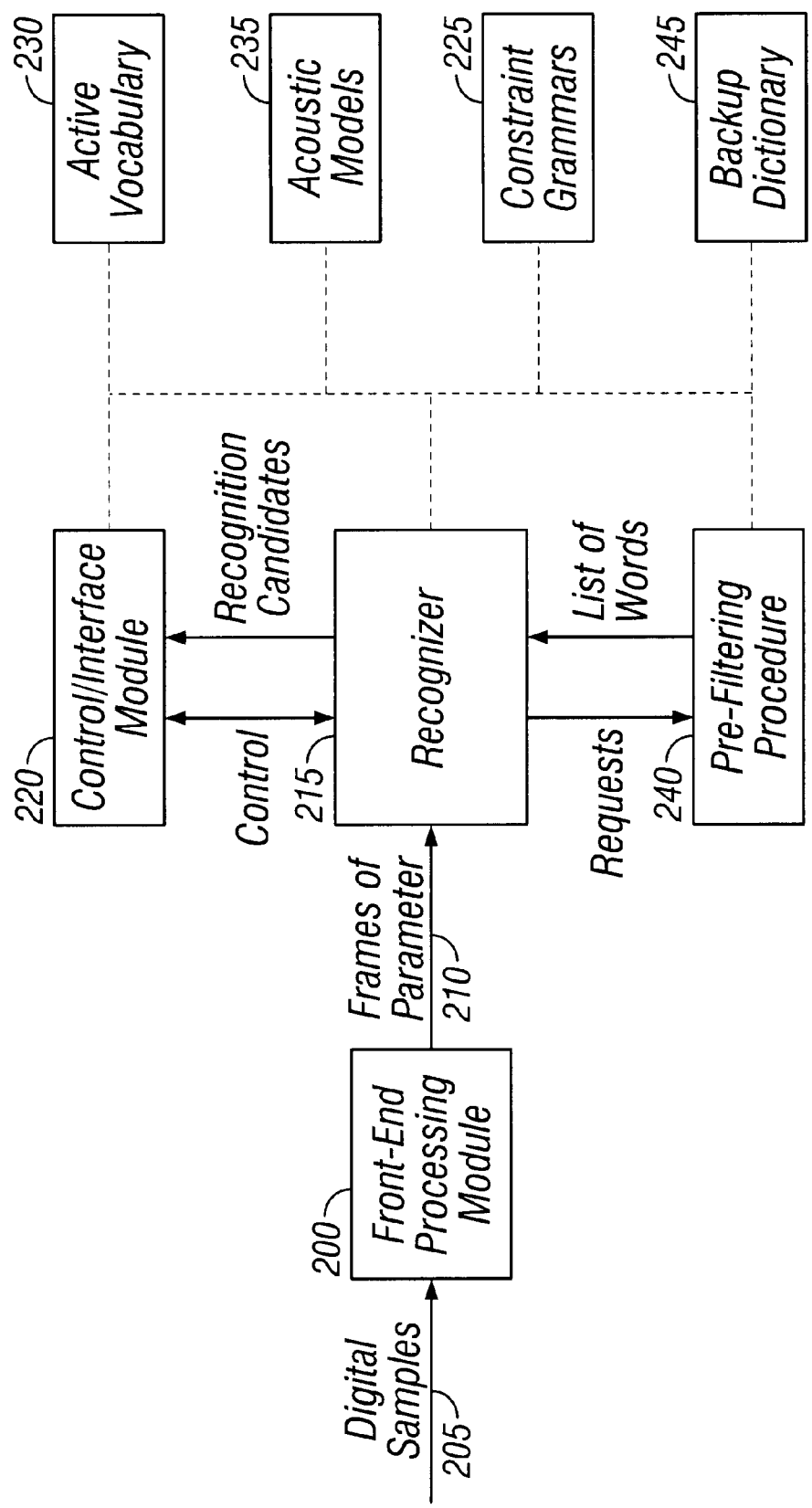
FIG. 2 is a block diagram of speech recognition software of the system of FIG. 1.

FIG. 2 illustrates components of the speech recognition software 160. For ease of discussion, the following description indicates that the components carry out operations to achieve specified results. However, it should be understood that each component actually causes the processor 130 to operate in the specified manner.

Initially, a front end processing module 200 converts the digital samples 205 from the sound card 140 (or from the digital recorder port 170) into frames of parameters 210 that represent the frequency content of an utterance. Each frame includes 24 parameters and represents a short portion (e.g., 10 milliseconds) of the utterance.

Figure 3:
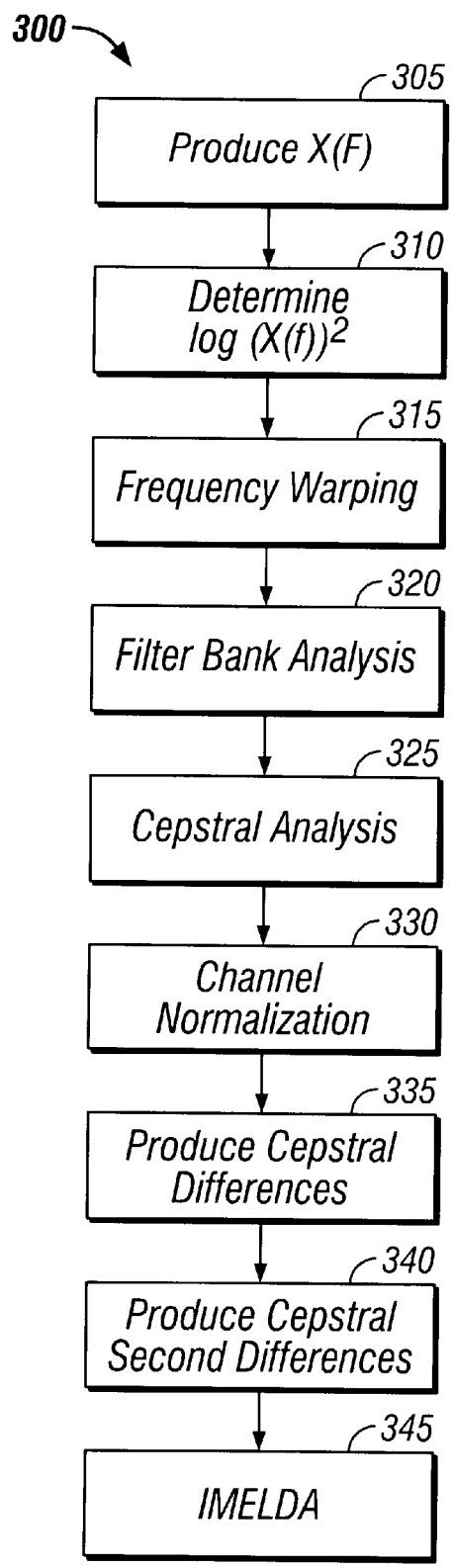
FIG. 3 is a flow chart of a signal processing procedure performed by the software of FIG. 2.

As shown in FIG. 3, the front end processing module 200 produces a frame from digital samples according to a procedure 300. The module first produces a frequency domain representation X(f) of the portion of the utterance by performing a Fast Fourier Transform (FFT) on the digital samples (step 305). Next, the module determines $\log(X(f))^2$ (step 310). The module may then perform frequency warping (step 315) and a filter bank analysis (step 320) to achieve speaker normalization. See S. Wegmann et al., "Speaker Normalization on Conversational Speech," Proc. 1996 ICASSP, pp. I.339–I.341, which is incorporated by reference.

From the normalized results, the module performs cepstral analysis to produce twelve cepstral parameters (step 325). The module generates the cepstral parameters by performing an inverse cosine transformation on the logarithms of the frequency parameters. Cepstral parameters and cepstral differences (described below) have been found to emphasize information important to speech recognition more effectively than do the frequency parameters. After performing channel normalization of the cepstral parameters (step 330), the module produces twelve cepstral differences (i.e., the differences between cepstral parameters in successive frames) (step 335) and twelve cepstral second differences (i.e., the differences between cepstral differences in successive frames) (step 340). Finally, the module performs an IMELDA linear combination transformation to select the twenty four most useful parameters from the twelve cepstral parameters, the twelve cepstral differences, and the twelve cepstral second differences (step 345).

Referring again to FIG. 2, a recognizer 215 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases, or sentences.

The recognizer 215 processes the frames 210 of an utterance in view of one or more constraint grammars 225. A constraint grammar, also referred to as a template or restriction rule, may be a limitation on the words that may correspond to an utterance, a limitation on the order or grammatical form of the words, or both. For example, a constraint grammar for menu-manipulation commands may include only entries from the menu (e.g., "file", "edit") or command words for navigating through the menu (e.g., "up", "down", "top", "bottom"). Different constraint grammars may be active at different times. For example, a constraint grammar may be associated with a particular application program 155 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

Figure 4A:
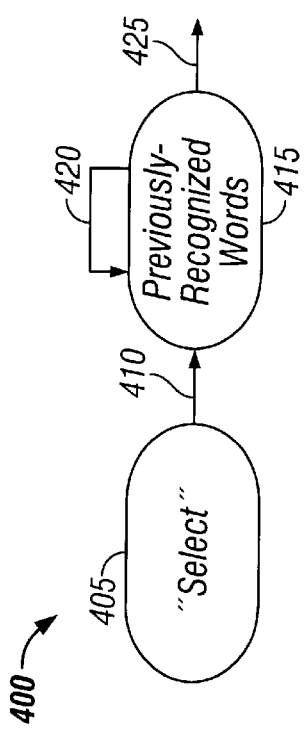
FIGS. 4A and 4B are state diagrams of a constraint grammar.
Figure 4B:
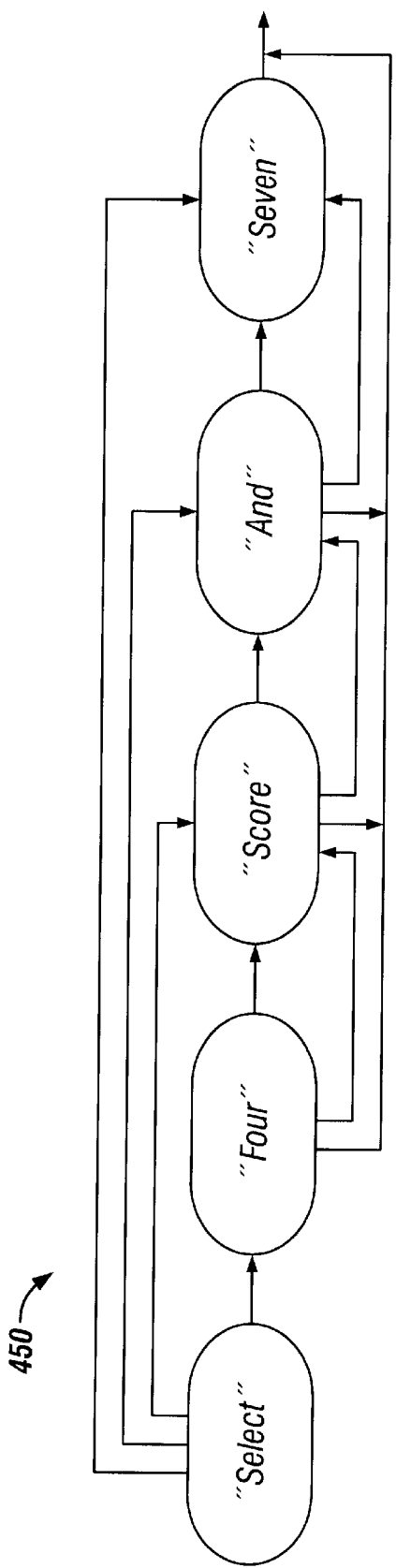

FIG. 4A illustrates an example of a constraint grammar for a "select" command used to select previously recognized text. As shown, a constraint grammar may be illustrated as a state diagram 400. The "select" command includes the word "select" followed by one more previously-recognized words, with the words being in the order in which they were previously recognized. The first state 405 of the constraint grammar indicates that the first word of the select command must be "select". After the word "select", the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 4B illustrates the state diagram 450 of the constraint grammar for the select command when a previously-recognized utterance is "four score and seven". This state diagram could be expanded to include words from additional utterances. The "select" command and techniques for generating its constraint grammar are described further in U.S. Pat. No. 5,794,189, entitled "CONTINUOUS SPEECH RECOGNITION" and issued Aug. 11, 1998, which is incorporated by reference.

The constraint grammar also may be expressed in Backus-Naur Form (BNF) or Extended BNF (EBNF). In EBNF, the grammar for the "Select" command is:

<recognition result>::=Select <words>,
where
    <words>::=[PRW$^1$[PRW$^2$[PRW$^3$ . . . PRW$^n$]]] |
    [PRW$^2$[PRW$^3$ . . . PRW$^n$]] |. . . [PRW$^n$],
    "PRW$^i$" is the previously-recognized word i,
    [ ] means optional,
    < > means a rule,
    | means an OR function, and
    ::=means "is defined as" or "is".

As illustrated in FIGS. 4A and 4B, this notation indicates that "select" may be followed by any ordered sequence of previously-recognized words. This grammar does not permit optional or alternate words. In some instances, the grammar may be modified to permit optional words (e.g., an optional "and" to permit "four score and seven" or "four score seven") or alternate words or phrases (e.g., "four score and seven" or "eighty seven") Constraint grammars are discussed further in U.S. Pat. No. 5,799,279, entitled "CONTINUOUS RECOGNITION OF SPEECH AND COMMANDS" and issued Aug. 25, 1998, which is incorporated by reference.

Another constraint grammar 225 that may be used by the speech recognition software 160 is a large vocabulary dictation grammar. The large vocabulary dictation grammar identifies words included in the active vocabulary 230, which is the vocabulary of words known to the software. The large vocabulary dictation grammar also indicates the frequency with which words occur. A language model associated with the large vocabulary dictation grammar may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition.

Other constraint grammars 225 include an in-line dictation macros grammar for dictation commands, such as "CAP" or "Capitalize" to capitalize a word and "New-Paragraph" to start a new paragraph; the select X Y Z grammar discussed above and used in selecting text; an error correction commands grammar; a dictation editing grammar; an application command and control grammar that may be used to control a particular application program 155; a global command and control grammar that may be used to control the operating system 150 and the speech recognition software 160; a menu and dialog tracking grammar that may be used to manipulate menus; and a keyboard control grammar that permits the use of speech in place of input devices, such as the keyboard 115 or the mouse 110.

The active vocabulary 230 uses a pronunciation model in which each word is represented by a series of phonemes that comprise the phonetic spelling of the word. Each phoneme may be represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations and language model information for the user. Dictation and command grammars may be split between vocabulary files to optimize language model information and memory use, and to keep each single vocabulary file under 64,000 words. There also is a set of system vocabularies.

Separate acoustic models 235 are provided for each user of the system. Initially speaker-independent acoustic models of male or female speech are adapted to a particular user's speech using an enrollment program. The acoustic models may be further adapted as the system is used. The acoustic models are maintained in a file separate from the active vocabulary 230.

The acoustic models 235 represent phonemes. In the case of triphones, the acoustic models 235 represent each triphone node as a mixture of Gaussian probability density functions ("PDFs"). For example, node "i" of a triphone "abc" may be represented as $ab^ic$:

$$ab^ic = \sum_k w_k N(\mu_k, c_k),$$

where each $w_k$ is a mixture weight, $$\sum_k w_k = 1,$$

$\mu k$ is a mean vector for the probability density function ("PDF") $N_k$, and $c_k$ is the covariance matrix for the PDF $N_k$. Like the frames in the sequence of frames, the vectors $\mu k$ each include twenty four parameters. The matrices $c_k$ are twenty four by twenty four matrices. Each triphone node may be represented as a mixture of up to, for example, sixteen different PDFs.

A particular PDF may be used in the representation of multiple triphone nodes. Accordingly, the acoustic models 235 represent each triphone node as a collection of mixture weights $w_k$ associated with up to sixteen different PDFs $N_k$ and separately represent each PDF $N_K$ using a mean vector $\mu_k$ and a covariance matrix $c_k$. Use of a particular PDF to represent multiple triphone nodes permits the models to include a smaller number of PDFs than would be required if each triphone node included entirely separate PDFs. Since the English language may be roughly represented using 43 different phonemes, there may be up to 79,507 ($43^3$) different triphones, which would result in a huge number of PDFs if each triphone node were represented by a separate set of PDFs. Representing multiple nodes with common PDFs also may remedy or reduce a data sparsity problem that results because some triphones (e.g., "tzp" in the English language) rarely occur. These rare triphones may be represented by having closely-related triphones share the same set of PDFs.

A large vocabulary dictation grammar may include multiple dictation topics (e.g., "medical" or "legal"), each having its own vocabulary file and its own language model. A dictation topic includes a set of words which represents the active vocabulary 230. In a typical example, a topic may include approximately 30,000 words that are considered for normal recognition.

A complete dictation vocabulary consists of the active vocabulary 230 plus a backup vocabulary 245. The backup vocabulary may include files that contain user-specific backup vocabulary words and system-wide backup vocabulary words.

User-specific backup vocabulary words include words which a user has created while using the speech recognition software. These words are stored in vocabulary files for the user and for the dictation topic, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary.

In addition to the user-specific backup vocabulary noted above, there is a system-wide backup vocabulary. The system-wide backup vocabulary contains all the words known to the system, including words which may currently be in an active vocabulary.

Referring again to FIG. 2, the recognizer 215 may operate in parallel with a pre-filtering procedure 240. Upon initiating processing of an utterance, the recognizer 215 requests from the pre-filtering procedure 240 a list of words that may have been spoken as the first word of the utterance (i.e., words that may correspond to the first and subsequent frames of the utterance). The pre-filtering procedure 240 performs a coarse comparison of the sequence of frames with the active vocabulary 230 to identify a subset of the vocabulary for which a more extensive comparison using the recognizer is justified.

Figure 5:
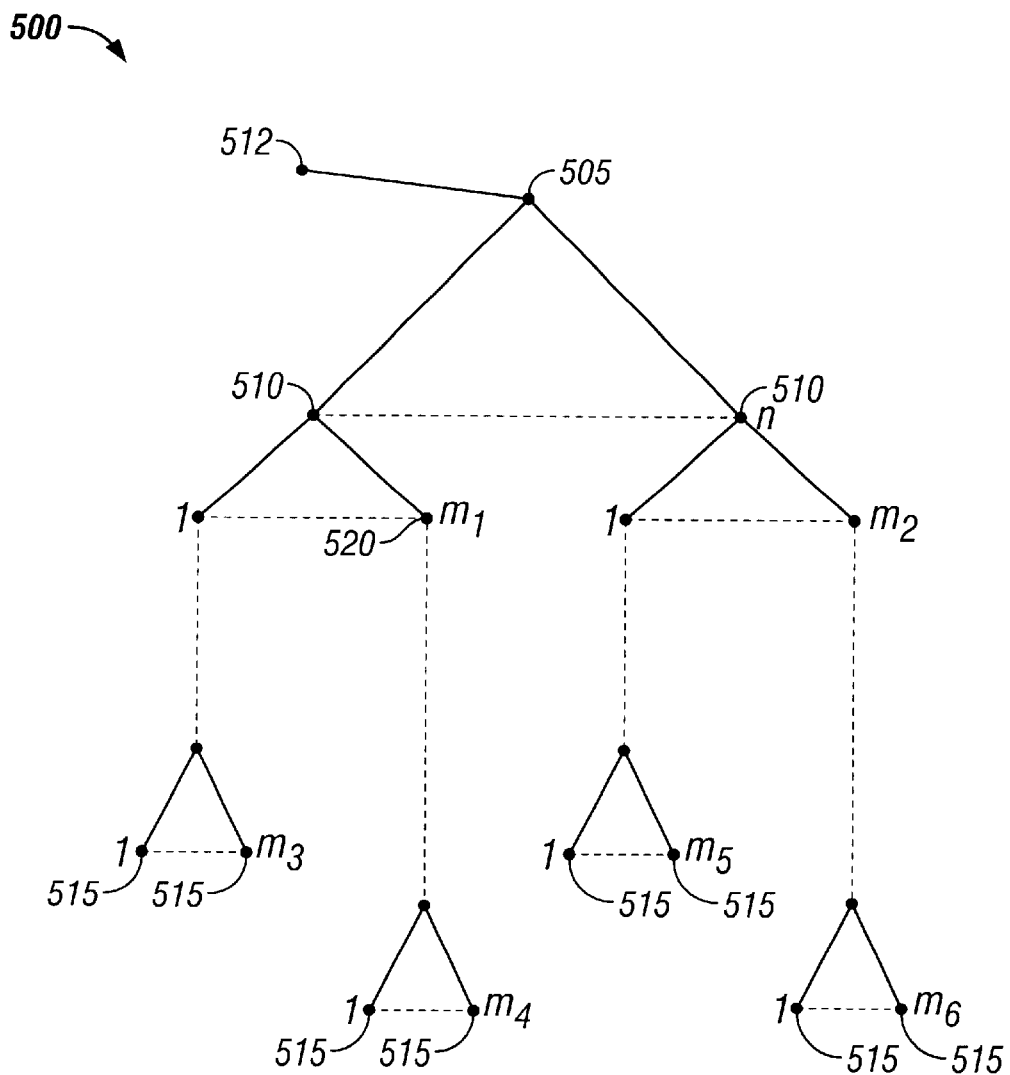
FIG. 5 is a graph of a lexical tree.
Figure 6:
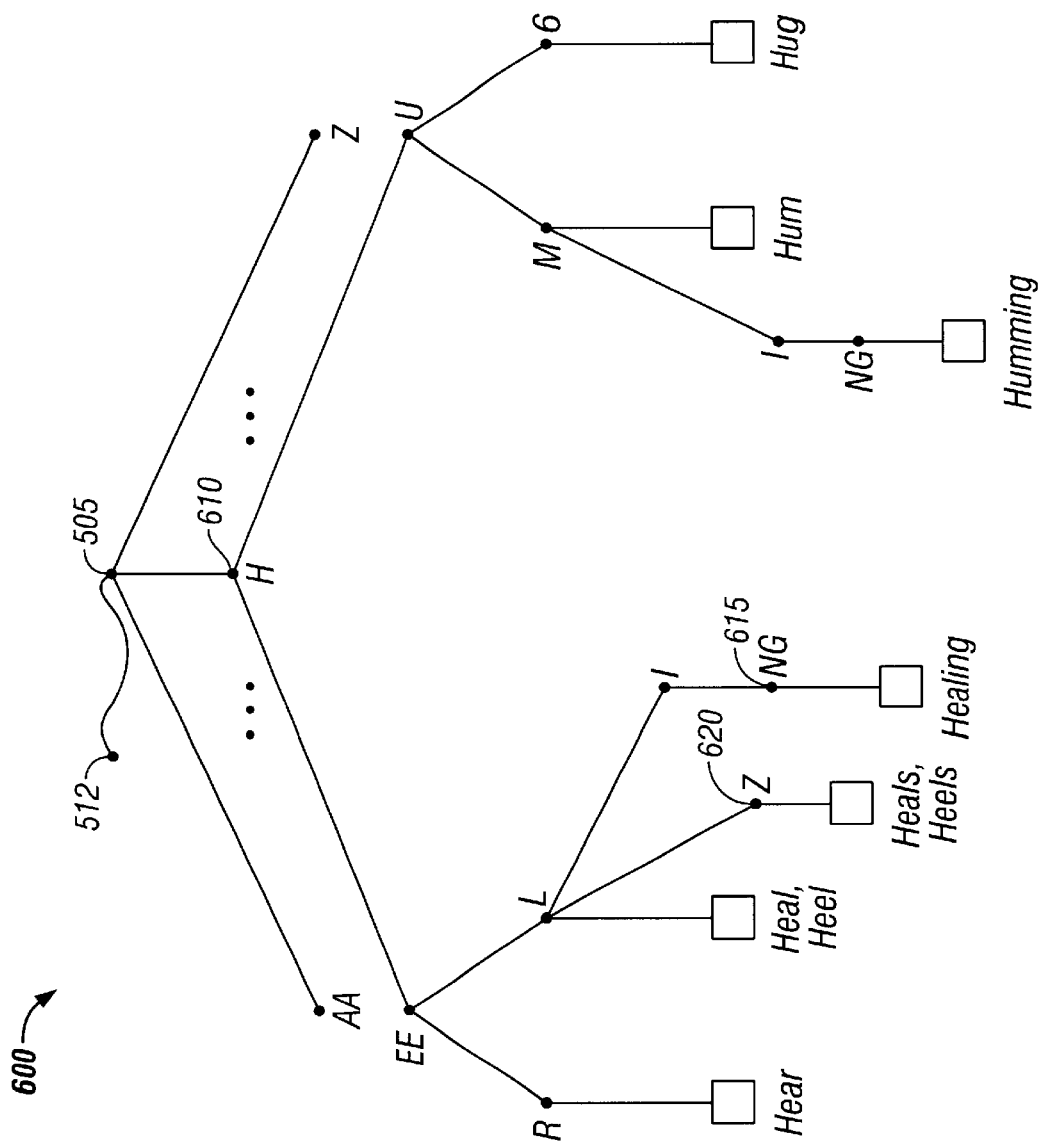
FIG. 6 is a graph of a portion of the lexical tree of FIG. 5.

Referring to FIGS. 5 and 6, the pre-filtering procedure 240 uses a lexical tree 500 that is initialized before processing begins. The lexical tree represents the active vocabulary 230 based on the phonetic relationships between words in the vocabulary. The lexical tree includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree. Leaf nodes also may correspond to commands. For example, a leaf node may correspond to the word "select" and to the command "SELECT". As noted above, commands may be associated with particular constraint grammars 225.

Figure 7:
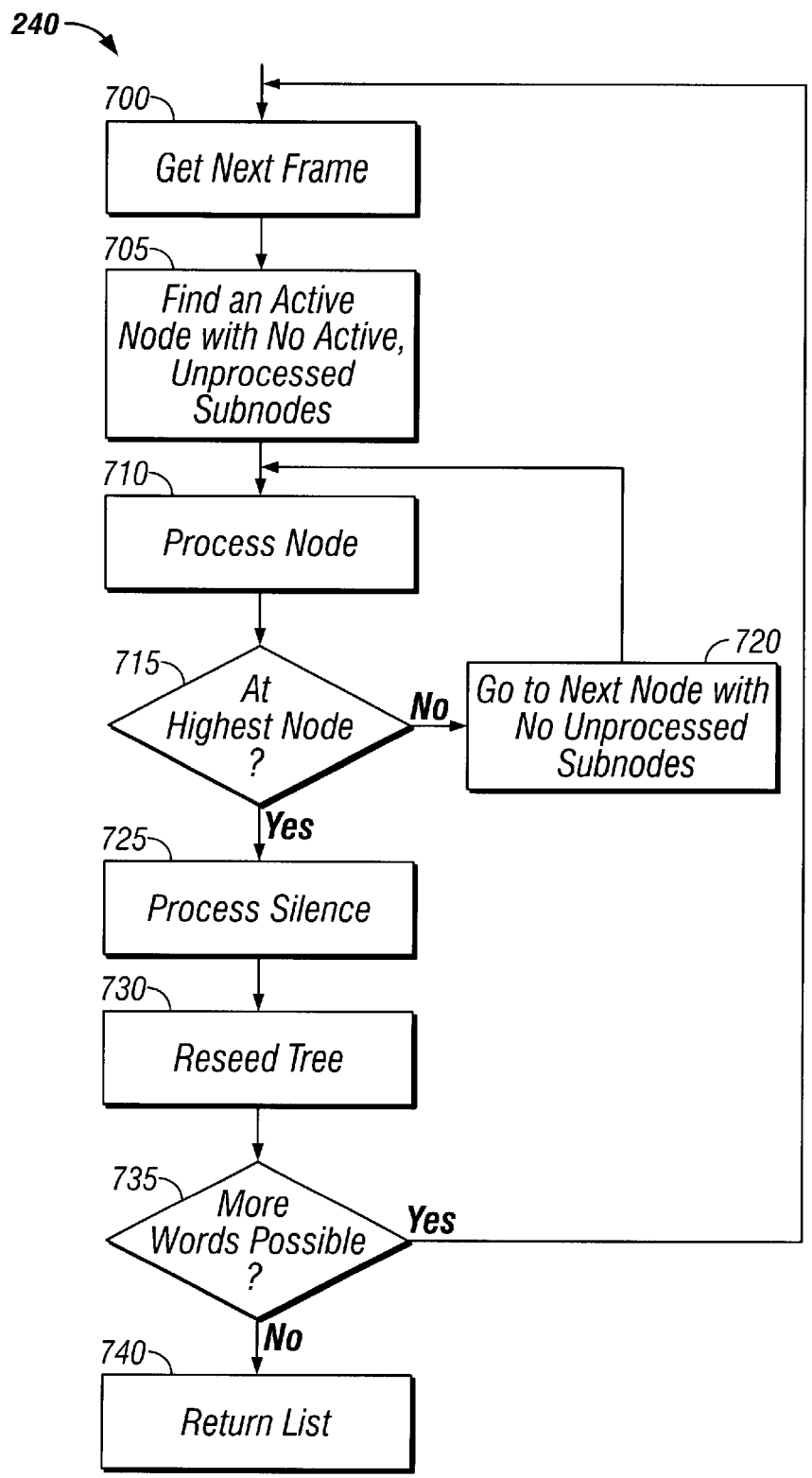
FIG. 7 is a flow chart of a pre-filtering procedure performed by the software of FIG. 2.

Operation of the pre-filtering procedure 240 is illustrated in FIG. 7. The pre-filtering procedure begins by retrieving the next frame of parameters for an utterance (step 700). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure finds an active node in the tree with no unprocessed active successors (step 705). Successors of a node also may be referred to as subnodes of the node. When the lexical tree is initialized, the silence node 512 is the only active node.

Next, the pre-filtering procedure processes the current node (step 710) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 710), the pre-filtering procedure determines whether the node is the highest node in the tree (i.e., the root node) (step 715). If the node is not the highest node, then the pre-filtering procedure goes to the next node having no unprocessed active subnodes (step 720) and processes that node (step 710). When searching for the next node to process, the pre-filtering procedure considers inactive nodes having active subnodes or active siblings.

If the processed node is the highest active node (step 715), then the pre-filtering procedure processes the silence node 512 (step 725). In general, the silence node is processed by comparing a frame to a model for silence and adding the resulting score to the minimum of the current score for the silence node and the score for the root node 505.

Next, the pre-filtering procedure reseeds the lexical tree (step 730). The pre-filtering procedure reseeds the tree whenever the silence node 512 is active or a word was produced by a leaf node of the lexical tree, regardless of whether the word was added to the list of words. The pre-filtering procedure reseeds the tree by replacing the score for the root node 505 with the minimum of the score for the silence node 512 and the scores for any words produced by leaf nodes of the lexical tree for the current frame. If the silence node is inactive and no leaf node has produced a word, then the pre-filtering procedure replaces the score for the root node 505 with a bad score (i.e., a score having a value larger than a pruning threshold).

Next, the pre-filtering procedure determines whether more words may be added to the word list for the requested time (step 735). If there are no active nodes in the lexical tree corresponding to speech that started at, before, or slightly after the start time for which the list was requested, and if the last frame to be processed corresponds to a time that is slightly after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure retrieves the next frame of parameters (step 700) and repeats the steps discussed above.

If words cannot be added to the word list (step 735), then the pre-filtering procedure returns the word list (step 740) to the recognizer 215. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number. The procedure also deletes any lists of words for times prior to the requested start time.

Each node of the lexical tree 500 (FIG. 5) represents a sequence of states for a particular phoneme. For example, FIG. 8A illustrates a node 800 that includes a first state 805, a second state 810, and a third state 815. A comparison with a frame of parameters may cause the score in a particular state to remain in the state (through a path 820). A score remains in the state when the score, after being adjusted based on a comparison with a model for the state, is better than a score passed from a preceding state or node, or when no score is passed from a preceding state or node. The comparison also may cause the score to be passed to a subsequent state through a path 825. A score is passed to a subsequent state when the score, after being adjusted based on a comparison with a model for the subsequent state, is better than the score in the subsequent state, or when no score is associated with the subsequent state. The score for the third state 815 may be passed to one or more subsequent nodes through a path 830.

Referring to FIG. 8B, the node 512 that corresponds to silence is represented by a single state 840. Each comparison with a frame of parameters may cause a score in the node to remain in the state 840 (through the path 845) and also may cause the score to be passed to the root node 505 through a path 850.

Referring to FIG. 8C, the root node 505 is represented by a single state 860. Comparison with a frame causes the score in the node to be passed to one or more subsequent nodes (including the silence node 512) through a path 865.

Each state of a node may be represented by four values: a score, a starting time, a leaving penalty, and a staying penalty. The score represents the likelihood that a series of frames has placed the lexical tree in the state (i.e., the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (i.e., the time at which the score was passed from the state 840 along the path 850).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 840 or the state 860. The same result could be achieved by setting the leaving and staying penalties for states 840 and 860 equal to zero. The following discussion also assumes that the first frame is the first frame that may correspond to speech instead of silence.

FIG. 9 provides a simplified example of how scores propagate through the lexical tree. Before the first frame is retrieved (row 900), state 840 (which corresponds to silence) has a score of 0 and no other nodes are active. The score of 0 means that there is a one hundred percent probability that the system is starting from silence.

After the first frame is retrieved (row 905), the score for the state 840 ($S_{A1}$) is set equal to the acoustic score ($A_{A1}$) resulting from an acoustic match of the first frame with an acoustic model corresponding to the state 840 (i.e., the acoustic model for silence). Thus, the score for the state 840 ($S_{A1}$) is set equal to the likelihood that the first frame corresponds to silence.

Retrieval of the first frame also causes the state 805 to become an active state. Assuming that the node 800 corresponds to a phoneme that starts a word, the score for the state 805 ($S_{B1}$) is set equal to the acoustic score ($A_{B1}$) resulting from an acoustic match of the first frame with the acoustic model corresponding to the state 805. Thus, the score for the state 805 ($S_{B1}$) is set equal to the likelihood that the first frame corresponds to the state 805. The starting time for the state 805 is set equal the time associated with the first frame. This value for the starting time indicates that the score at state 805 represents a word that started at a time corresponding to the first frame. The starting time moves with the score as the score propagates through the lexical tree.

After the second frame is retrieved (row 910), the score for the state 840 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}\times A_{A1}+A_{A2}.$$

As noted above, each of the scores corresponds to a negative logarithmic probability. Accordingly, adding scores together corresponds to multiplying the probabilities. Thus, the score for the state 840 ($S_{A2}$) equals the likelihood that both of the first and second frames correspond to silence. This process is repeated for subsequent frames (e.g., lines 915 and 920) so that the score for the state 840 at a frame "n" ($S_{An}$) equals:

$$S_{An} = S_{An-1} + A_{An} = \sum_{m=1}^{n} A_{Am}.$$

This expression assumes that the silence node 512 is not reseeded from the root node 505. If reseeding occurs at a frame n, then the value of $S_{An-1}$ would be replaced by the score in the root node 505 for the frame n−1.

After the second frame is retrieved, the score for the state 805 ($S_{B2}$) is set equal to:

$$S_{B2}=\min(S_{B1}+\text{stay}_B, S_{A1})+A_{B2},$$

where $A_{B2}$ is the acoustic score resulting from an acoustic match of the second frame with the acoustic model corresponding to state 805 and $\text{stay}_B$ is the staying penalty for state 805. The score for state 805 ($S_{B2}$) corresponds to the more likely of two alternatives: (1) the first frame was silence and the second frame was the sound represented by the state 805 or (2) both of the first and second frames were the sound represented by the state 805. The first alternative corresponds to a transition from state 840 to state 805 along the path 850. The second alternative corresponds to a transition from state 805 back to state 805 along path 820. When the first alternative is the more likely, the starting time corresponding to the first frame that was stored previously for the state 805 is replaced by a value corresponding to the second frame. This value indicates that the score at state 805 represents a word that started with the second frame.

After the second frame is retrieved, the state 810 becomes an active state. The score for the state 810 ($S_{C2}$) is set equal to:

$$S_{C2}=S_{B1}+\text{leave}_B+A_{C2},$$

where $A_{C2}$ is the acoustic score resulting from an acoustic match of the second frame with the acoustic model corresponding to state 810 and $\text{leave}_B$ is the leaving penalty for the state 805. Similarly, $\text{leave}_C$ and $\text{leave}_D$ are leaving penalties for, respectively, states 810 and 815. The sum of language model components of $\text{leave}_B$, $\text{leave}_C$ and $\text{leave}_D$ represents the language model score for the phoneme represented by the node 800.

The methodology for determining state scores for states other than the silence state can be expressed more generally as:

$$S_{i,j}=\min(S_{i,j-1}+\text{stay}_j, S_{i-1,j-1}+\text{leave}_{j-1})+A_{i,j}.$$

for i greater than zero (where i equals zero corresponds to silence), and with the boundary condition that the score for an inactive state equals infinity or some sufficiently large value. The starting time for the state may be represented as:

$t_{i,j}=t_{i-1,j-1}$ for $S_{i,j-1}+\text{stay}_i \leq Si-1,j-1+\text{leave}_{j-1}$, or $t_{i,j}=t_{i-1,j-1}$ for $S_{i,j-1}+\text{stay}_i > Si-1,j-1+\text{leave}_{j-1}$, for i and j greater than zero and with the boundary condition that the time value for a newly active state represents the frame at which the state became active. As previously noted, state scores for the silence state may be determined as:

$$S_{0,j} = S_{0,j-1} + A_{0,j} = \sum_{m=1}^{j} A_{0,m}.$$

with the boundary condition that $S_{0,0}$ equals zero. An even more general form, in which the scores are expressed as functions of the various parameters, is illustrated in FIG. 10.

Figure 11:
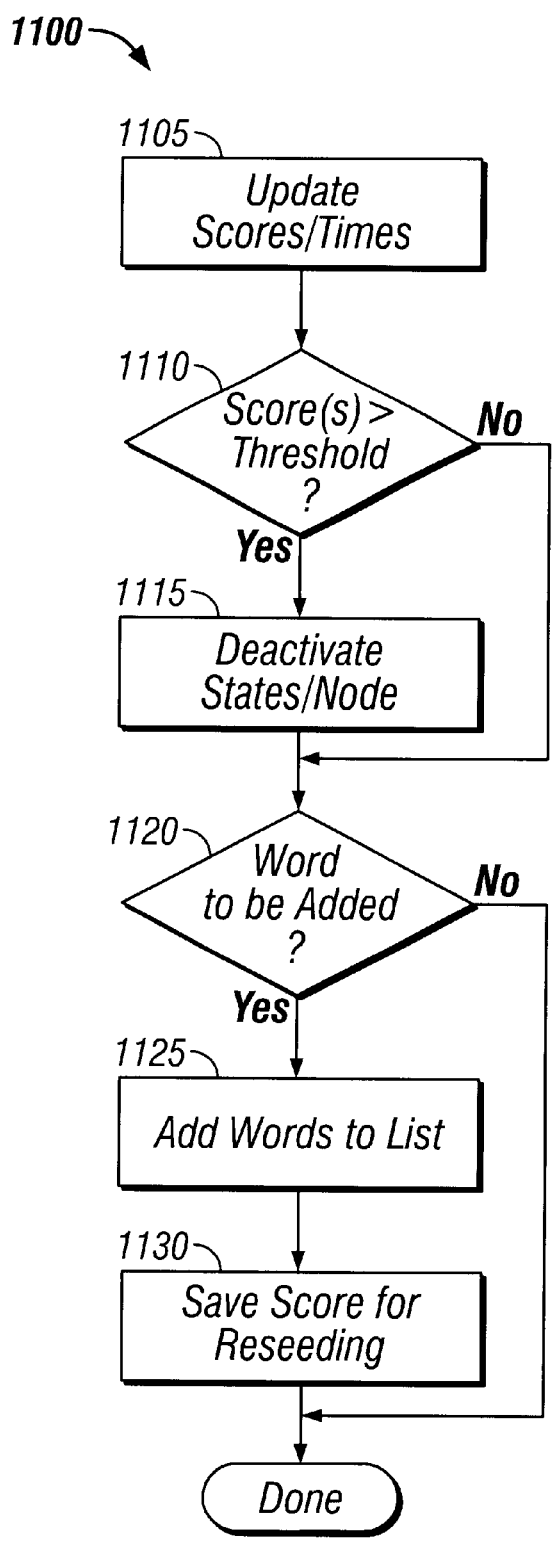
FIG. 11 is a flow chart of a procedure for processing nodes of a lexical tree.

Referring to FIG. 11, a node may be processed according to a node-processing procedure 1100. Initially, the node-processing procedure updates the scores and time values for each state of the node (step 1105). The node-processing procedure updates the scores and time values by generating acoustic scores and using the equations discussed above.

When the last state of the node was active prior to updating the scores for the node, the node-processing procedure uses the score for the last state to generate scores for any inactive subnodes of the node. If the generated score for a subnode does not exceed a pruning threshold, then the node-processing procedure activates that subnode and provides the subnode with the generated score.

Next, the node-processing procedure determines whether the score of any state of the node exceeds the pruning threshold (step 1110). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 1115). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure may activate a node or state by creating a record and associating the record with the node or state, or by indicating in an existing record that the node or state is active. The procedure may use a dynamic pruning threshold that accounts for variations in the average or best score in the lexical tree at any given time.

Next, the node-processing procedure determines whether a word is to be added to a list of words (step 1120). A word is added to the list of words when the node being processed corresponds to the last phoneme of a word, a score has been propagated out of the last state of the node, and the score is less than a list threshold. Before comparing the score to the list threshold, the node-processing procedure adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure adds the word or words to the list (step 1125). A word is stored in the list of words along with the score propagated out of the last state. If the word is on the list already, then the node-processing procedure stores with the list the better of the score already stored with the list or the score propagated out of the last state. The scores for words in a list of words are returned along with the list of words. The recognizer 215 uses these scores in making the detailed match.

The node-processing procedure also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure spreads the word across multiple lists based on the length of the word.

After adding a word to the list of words (step 1125), the node-processing procedure saves the score associated with the word as a reseeding score for use in reseeding the tree (step 1130). Production of a word by the lexical tree means that the current frame may correspond to the last frame of the word (with the probability of such a correspondence being reflected by the score associated with the word). This means that the next frame may correspond to the beginning of a word or to silence resulting from a pause between words. The pre-filtering procedure reseeds the tree (step 730 of FIG. 7) to account for this possibility.

For a given frame, multiple nodes may produce words. However, the tree only needs to be reseeded once. To account for this, the node-processing procedure only saves the score associated with a word ($S_w$) as the reseeding score ($S_{RS}$) if the word is the first word to be generated by the tree for the current frame of if the word score is less than the score for all other words generated by previously-processed nodes for the current frame ($S_{RS}'$):

SRS=min($S_w$, $S_{RS}'$).

Saving only the lowest score (i.e., the score indicating the highest probability that the current frame was the last frame of a word) ensures that the tree will be reseeded using the highest probability that the next frame is the first frame of a new word.

To reseed the tree (step 730 of FIG. 7), the pre-filtering procedure activates the root node 505 and associates the minimum of the reseeding score ($S_{RS}$) and the score for the silence node 512 with the root node. During processing of the next frame, the active root node 505 may be used to activate nodes in the group 510 or to activate the silence node 512.

Processing of the node is complete after the node-processing procedure saves a score for use in reseeding the tree (step 1130), or if no word is to be added to the list of words (step 1120). The lexical tree pre-filtering procedure is discussed in detail in U.S. Pat. No. 5,822,730, entitled "LEXICAL TREE PRE-FILTERING IN SPEECH RECOGNITION" and issued Oct. 13, 1998, which is incorporated by reference.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypotheses for each word on the list, where each new hypothesis includes the words of the old hypothesis plus the corresponding new word from the list.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The scores provided by the pre-filtering procedure include components corresponding to a crude acoustic comparison and a language model score indicative of the likelihood that a word is used, independently of context. The recognizer may eliminate any hypothesis that is associated with a constraint grammar (e.g., a command hypothesis), but does not comply with the constraint grammar.

Figure 12:
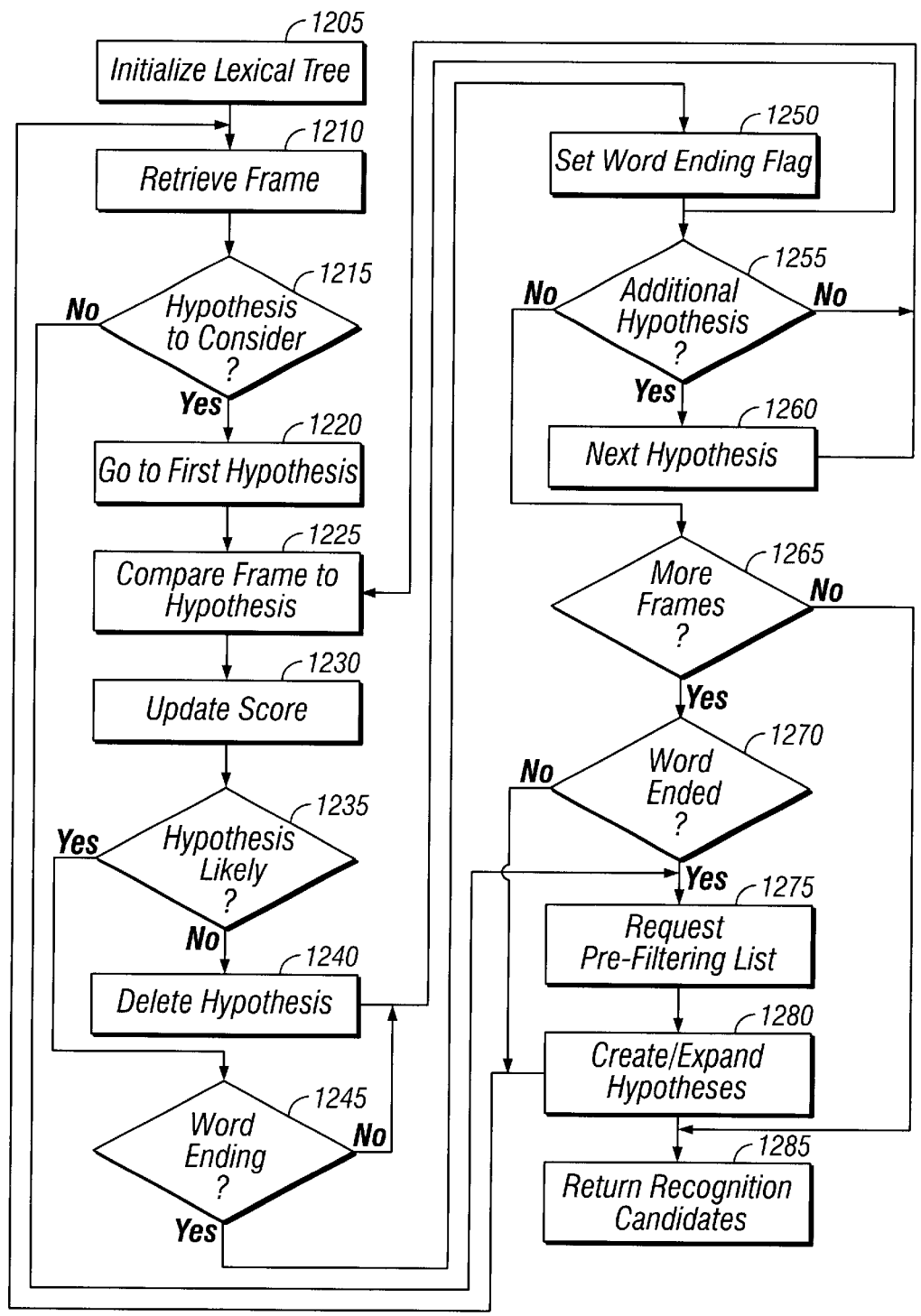
FIG. 12 is a flow chart of a speech recognition procedure.

Referring to FIG. 12, the recognizer 215 operates according to a procedure 1200. First, prior to processing, the recognizer 215 initializes the lexical tree 500 as described above (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer determines whether the user was likely to have spoken the word or words corresponding to the hypothesis (step 1235). The recognizer makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer determines that the word or words corresponding to the hypothesis were likely to have been spoken by the user, then the recognizer determines whether the last word of the hypothesis is ending (step 1245). The recognizer determines that a word is ending when the frame corresponds to the last component of the model for the word. If the recognizer determines that a word is ending (step 1245), the recognizer sets a flag that indicates that the next frame may correspond to the beginning of a word (step 1250).

If there are additional hypotheses to be considered for the frame (step 1255), then the recognizer selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer determines that there are more frames to be considered when two conditions are met. First, more frames must be available. Second, the best scoring node for the current frame or for one or more of a predetermined number of immediately preceding frames must have been a node other than the silence node (i.e., the utterance has ended when the silence node is the best scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer requests from the pre-filtering procedure 240 a list of words that may start with the next frame (step 1275).

Upon receiving the list of words from the pre-filtering procedure, the recognizer uses the list of words to create hypotheses or to expand any hypothesis for which a word has ended (step 1280). Each word in the list of words has an associated score. Prior to adding a list word to a hypothesis, the recognizer modifies the list score ($S_L$) for the word to produce a modified list score ($S_{ML}$) as:

$$S_{ML} = S_L + L_C - L_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 225 and abandons any hypothesis that corresponds to no active constraint grammar. The recognizer then retrieves the next frame (step 1210) and repeats the procedure.

If there are no more speech frames to process, then the recognizer 215 provides the most likely hypotheses to the control/interface module 220 as recognition candidates (step 1285).

The control/interface module 220 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. When the best-scoring recognition candidate is a command, the control/interface module 220 implements the command. For example, the control/interface module may control operation of the speech recognition software in response to speech recognition commands (e.g., "wake up", "make that"), and may forward external commands to the appropriate software.

The control/interface module also controls the active vocabulary, acoustic models, and constraint grammars that are used by the recognizer. For example, when the speech recognition software is being used in conjunction with a particular application (e.g., Microsoft Word), the control/interface module updates the active vocabulary to include command words associated with that application and activates constraint grammars associated with the application.

Other functions provided by the control/interface module 220 include a vocabulary customizer and a vocabulary manager. The vocabulary customizer optimizes the language model of a specific topic by scanning user supplied text. The vocabulary manager is a developer tool which is used to browse and manipulate vocabularies, grammars and macros.

Each such function of the control/interface module 220 may be implemented as an executable program that is separate from the main speech recognition software. Similarly, the control/interface module 220 also may be implemented as a separate executable program.

The control/interface module 220 also may provide an enrollment program that uses an enrollment text and a corresponding enrollment grammar to customize the speech recognition software to a specific user. The enrollment program may operate in an interactive mode that guides the user through the enrollment process, or in a non-interactive mode that permits the user to enroll independently of the computer. In the interactive mode, the enrollment program displays the enrollment text to the user and the user reads the displayed text. As the user reads, the recognizer 215 uses the enrollment grammar to match a sequence of utterances by the user to sequential portions of the enrollment text. When the recognizer 215 is unsuccessful, the enrollment program prompts the user to repeat certain passages of the text. The recognizer uses acoustic information from the user's utterances to train or adapt acoustic models 235 corresponding to the matched portions of the enrollment text. The interactive enrollment program is discussed in U.S. application Ser. No. 08/825,536, entitled "ENROLLMENT IN SPEECH RECOGNITION" and filed Mar. 28, 1997, which is incorporated by reference.

In the non-interactive mode, the user reads the text without prompting from the computer. This offers the considerable advantage that, in addition to reading text displayed by the computer, the user can read from a printed text independent of the computer. Thus, the user could read the enrollment text into a portable recording device and later download the recorded information into the computer for processing by the recognizer. In addition, the user is not required to read every word of the enrollment text, and may skip words or paragraphs as desired. The user also may repeat portions of the text. This adds substantial flexibility to the enrollment process.

The enrollment program may provide a list of enrollment texts, each of which has a corresponding enrollment grammar, for the user's selection. Alternatively, the user may input an enrollment text from another source. In this case, the enrollment program may generate the enrollment grammar from the input enrollment text, or may employ a previously generated enrollment grammar.

The control/interface module 220 also implements error correction and cursor/position manipulation procedures of the software 160. Error correction procedures include a "make that" command and a "spell that" command. Cursor/position manipulation procedures include the "select" command discussed above and variations thereof (e.g, "select [start] through [end]"), "insert before/after" commands, and a "resume with" command.

During error correction, word searches of the backup vocabularies start with the user-specific backup dictionary and then check the system-wide backup dictionary.

The backup dictionaries also are searched when there are new words in text that a user has typed.

Figure 13A:
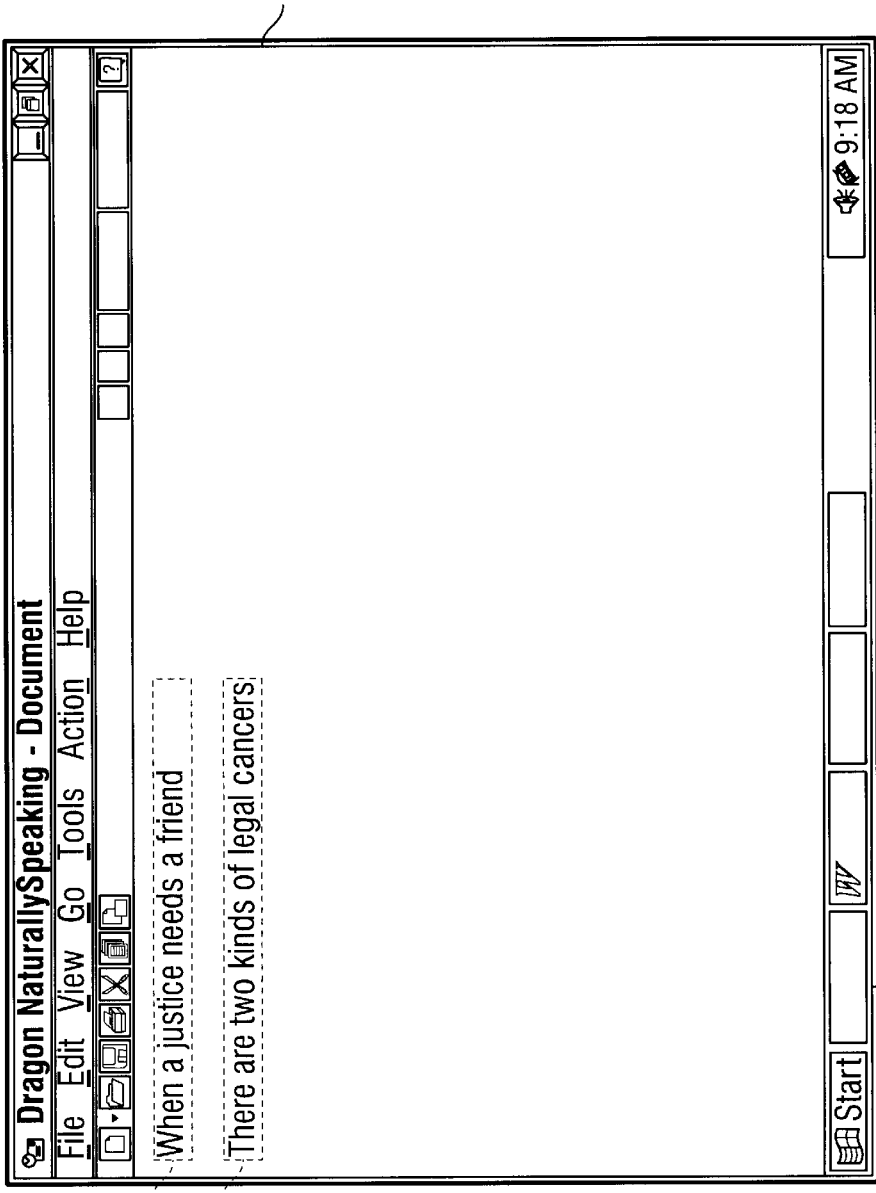
FIGS. 13A–13N are screen displays of a user interface of the speech recognition system of FIG. 1.

When the system makes a recognition error, the user may invoke an appropriate correction command to remedy the error. FIGS. 13A–13N illustrate a user interface provided by the control/interface module 220 in response to a sequence of interspersed text and commands. As shown in FIG. 13A, the recognizer 215 correctly recognizes a first utterance 1300 ("When a justice needs a friend New-Paragraph") and the control/interface module 220 displays the results 1305 ("When a justice needs a friend") of recognizing the utterance in a dictation window 1310. The module 220 displays text 1305 ("When a justice needs a friend") corresponding to a text portion of the utterance and implements the formatting command ("New-Paragraph") included in the utterance.

The recognizer 215 incorrectly recognizes a second utterance 1315 ("there are two kinds of legal kibitzers") by incorrectly recognizing the word "kibitzers" as "cancers". The control/interface module 220 displays this incorrect result 1316 ("There are two kinds of legal cancers") in the dictation window 1310. The control/interface module also displays the results of recognizing the current utterance, which, in this case, is the second utterance, in a display field 1320 at the bottom of the window 1310.

Figure 13B:
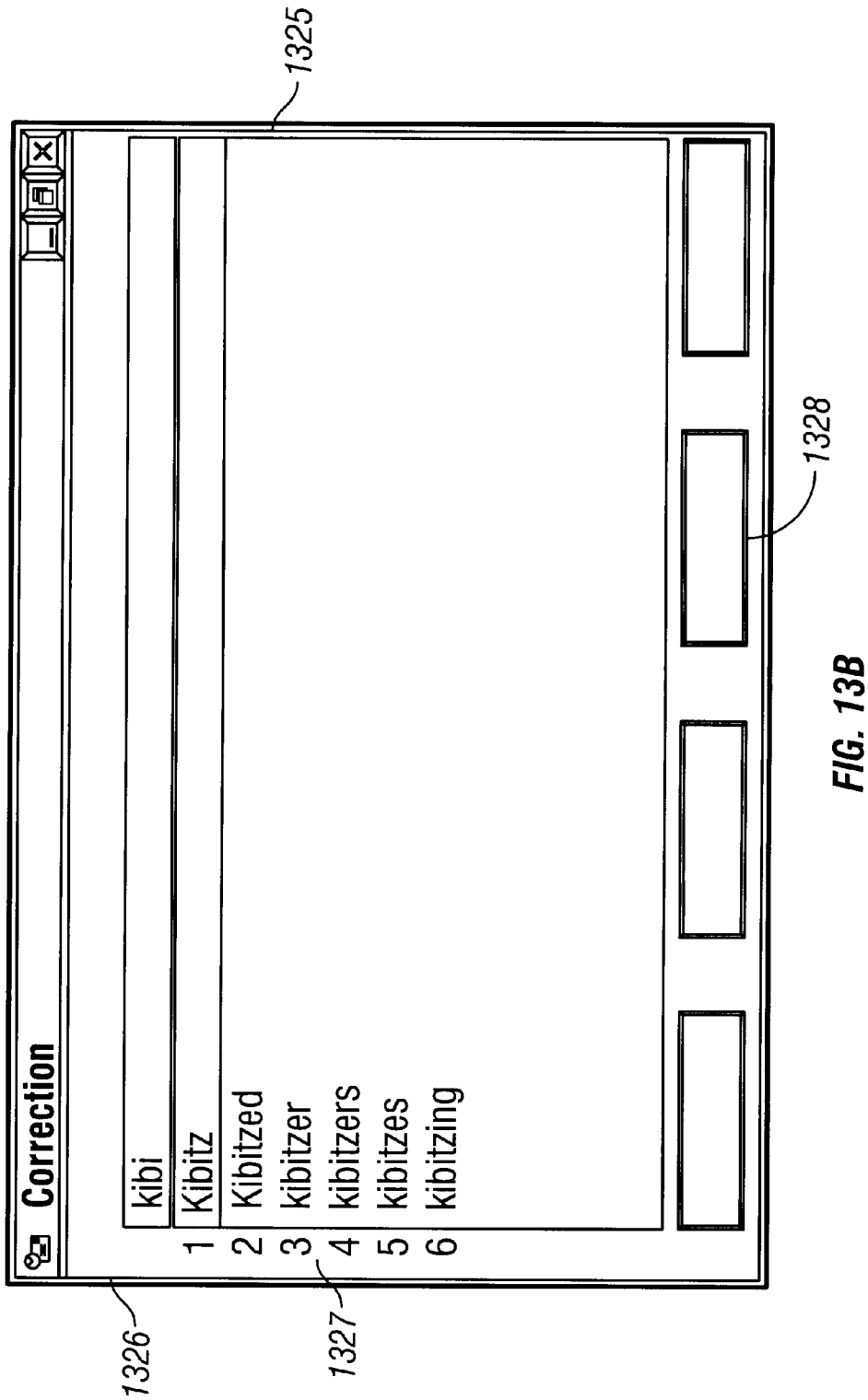

As shown in FIG. 13B, the user corrects the incorrect recognition by selecting the word "cancers" using the mouse 110 and saying "Spell That k i b i". The control/interface module responds to recognition of the "Spell That" command by displaying a correction dialog box 1325, such as is illustrated in FIG. 13B. The box 1325 displays a numbered list of words 1326 starting with the indicated letters ("kibi"). Instead of using the mouse 110 to select the word "cancer", the user could have verbally selected the word using a "Select" command by saying "Select cancer". Similarly, instead of saying "Spell That k i b i", the user could have typed the letters "k i b i".

Figure 13C:
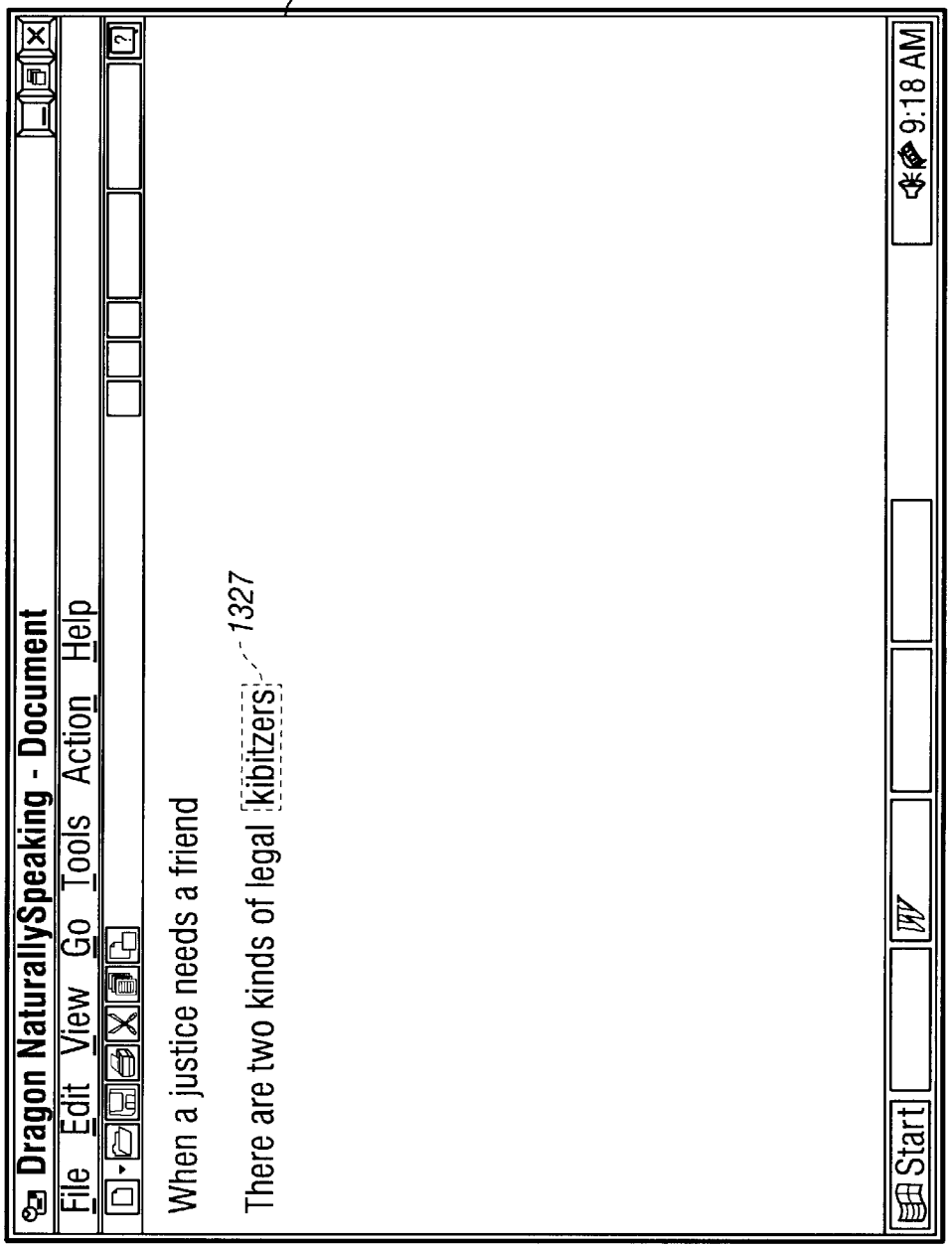

The user selects the correct word 1327 ("kibitzers") by saying "Choose 4", where "kibitzers" is the fourth word on the choice list. As shown in FIG. 13C, the control/interface module 220 responds by replacing the incorrect word ("cancers") with the selected word 1327 in the dictation window 1310.

Referring again to FIG. 13B, the correction dialog box 1325 includes a "Train" button 1328. When the user selects this button, the control/interface module responds by prompting the user through a training session to obtain one or more samples from the user of the word or words to be trained. The recognizer uses these samples to adapt acoustic models for the words to the user's speech patterns.

Figure 13D:
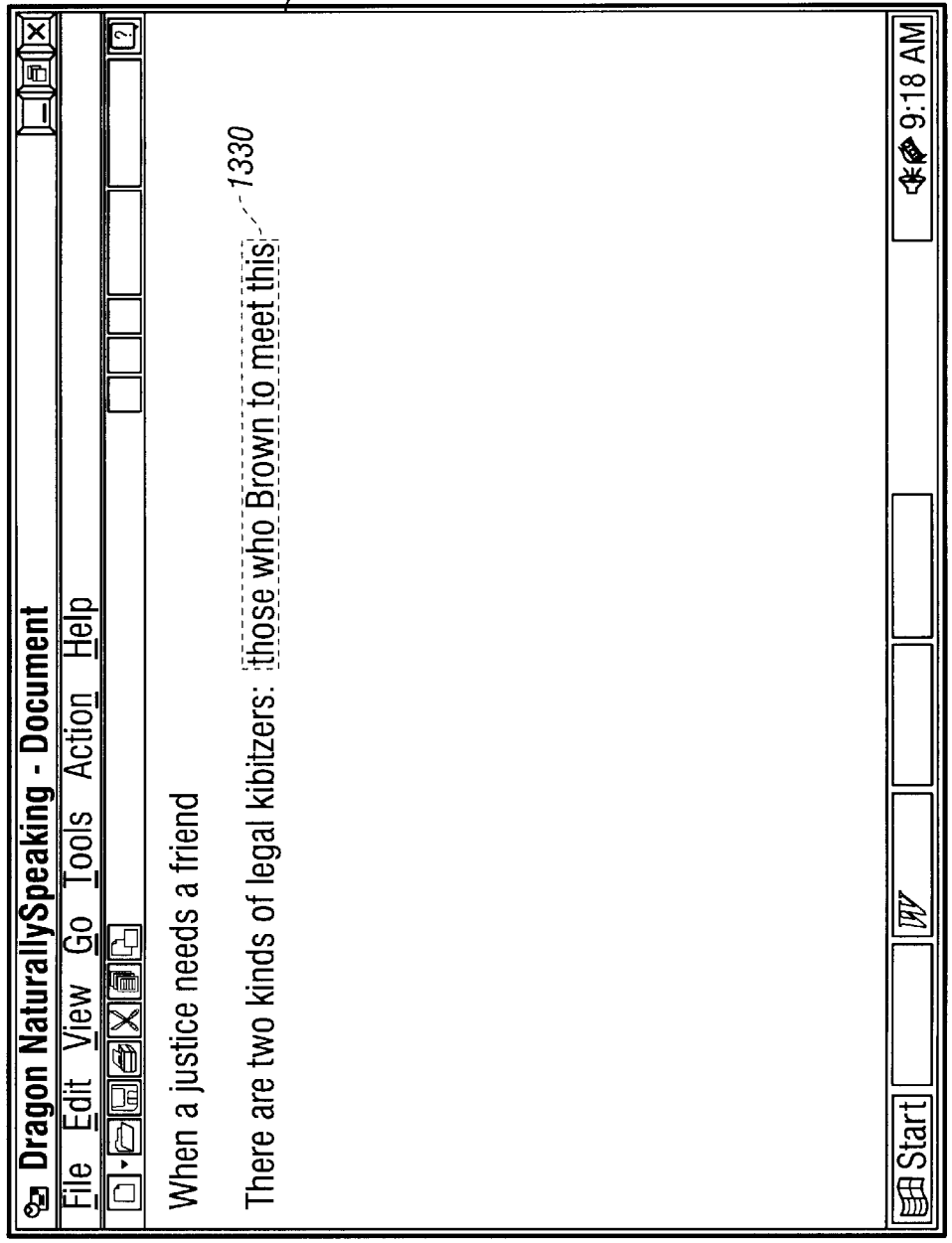
Figure 13E:
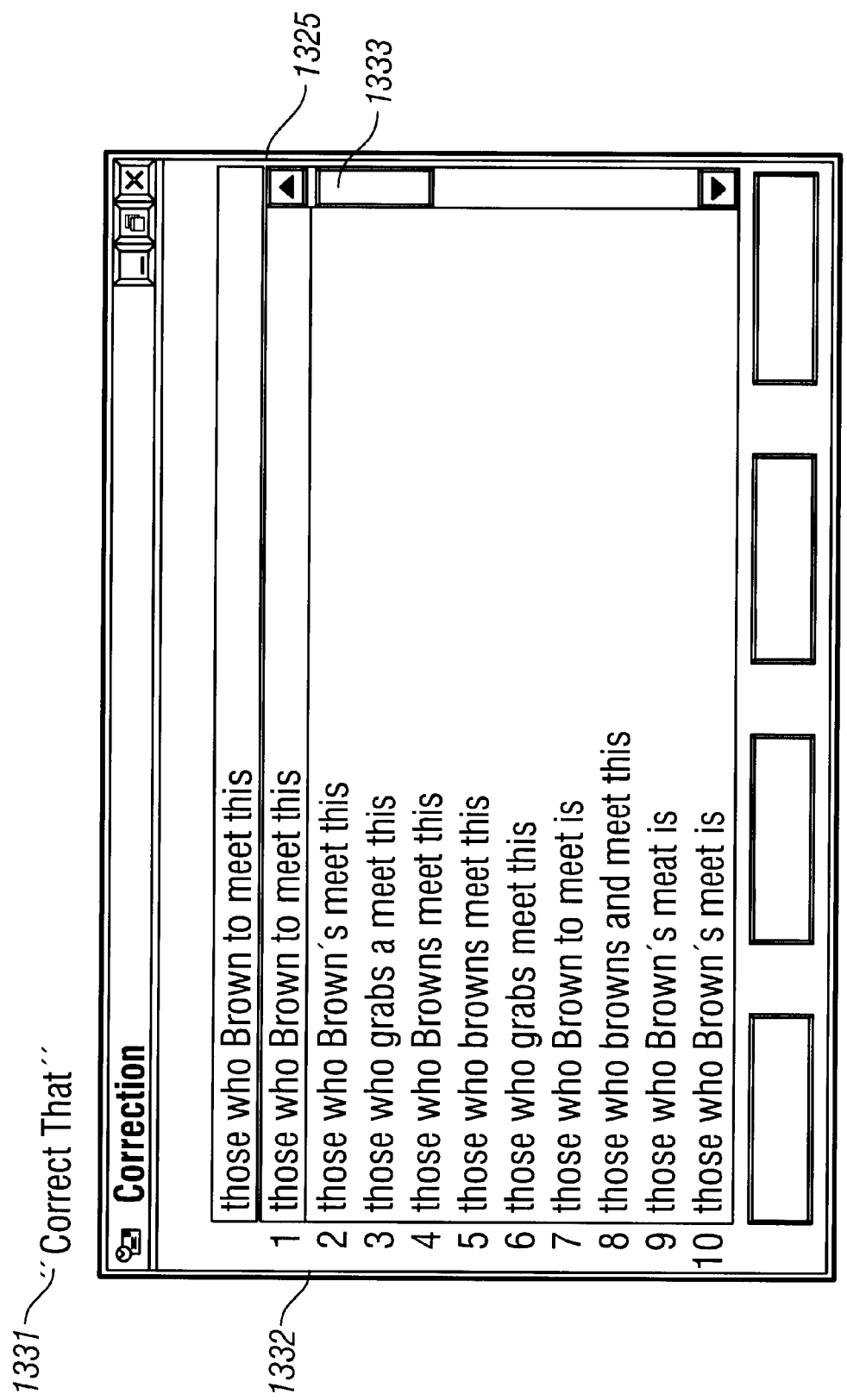

As shown in FIG. 13D, the recognizer 215 next misrecognizes a third utterance 1329 ("those who pronounce amicus") and the control/interface module 220 responds by inserting the incorrect text 1330 ("those who Brown to meet this") in the dictation window 1310. As shown in FIG. 13E, the user causes the control/interface module 220 to generate the correction dialog box 1325 by saying the "Correct That" command 1331. The correction dialog box 1325 includes a list 1332 of recognition candidates for the entire utterance 1329. Though the dialog box 1325 permits only ten recognition candidates to be displayed at a single time, the list 1332 may include more than ten entries. Additional entries may be accessed using a scroll bar 1333.

Figure 13F:
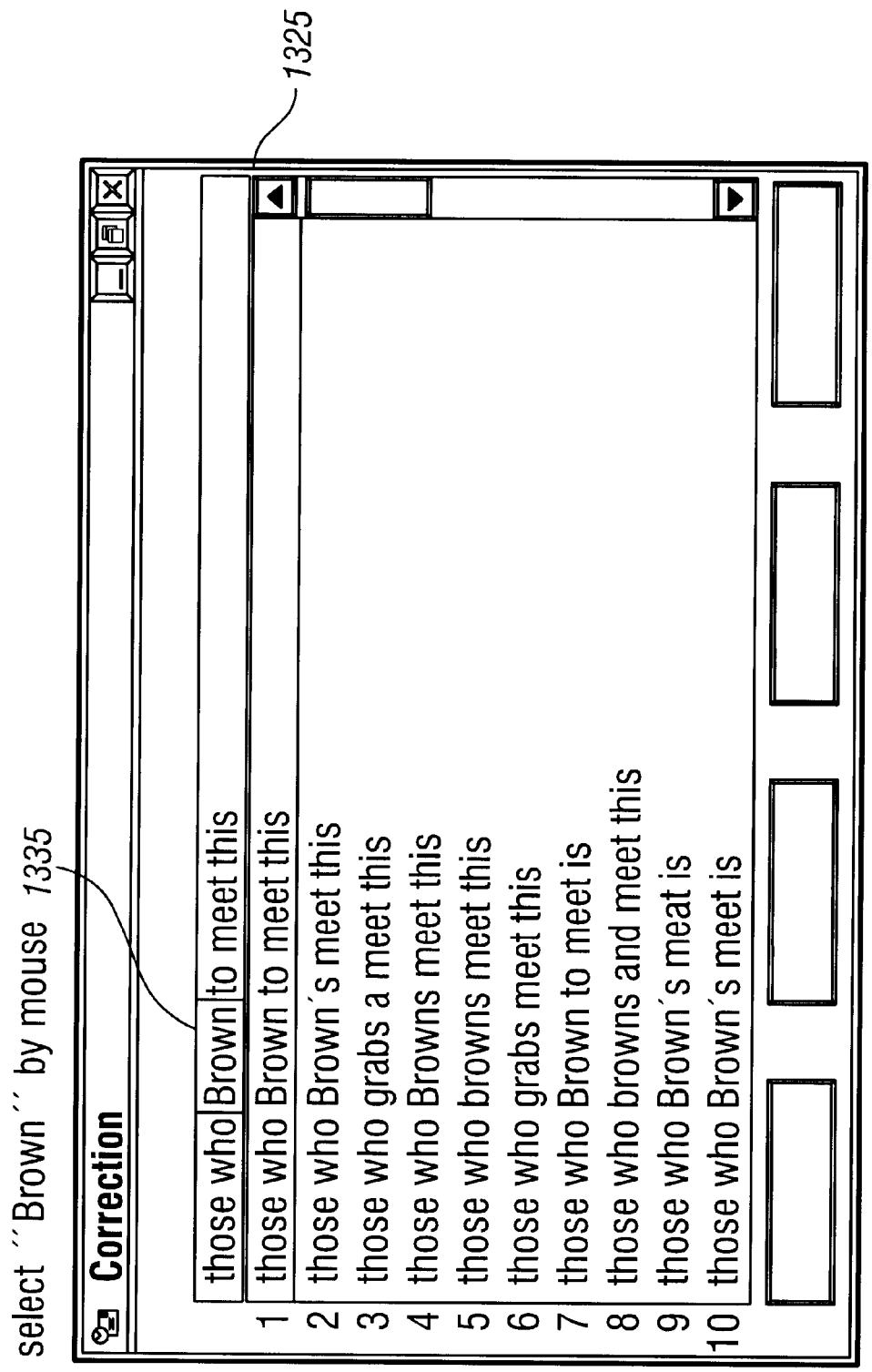
Figure 13G:
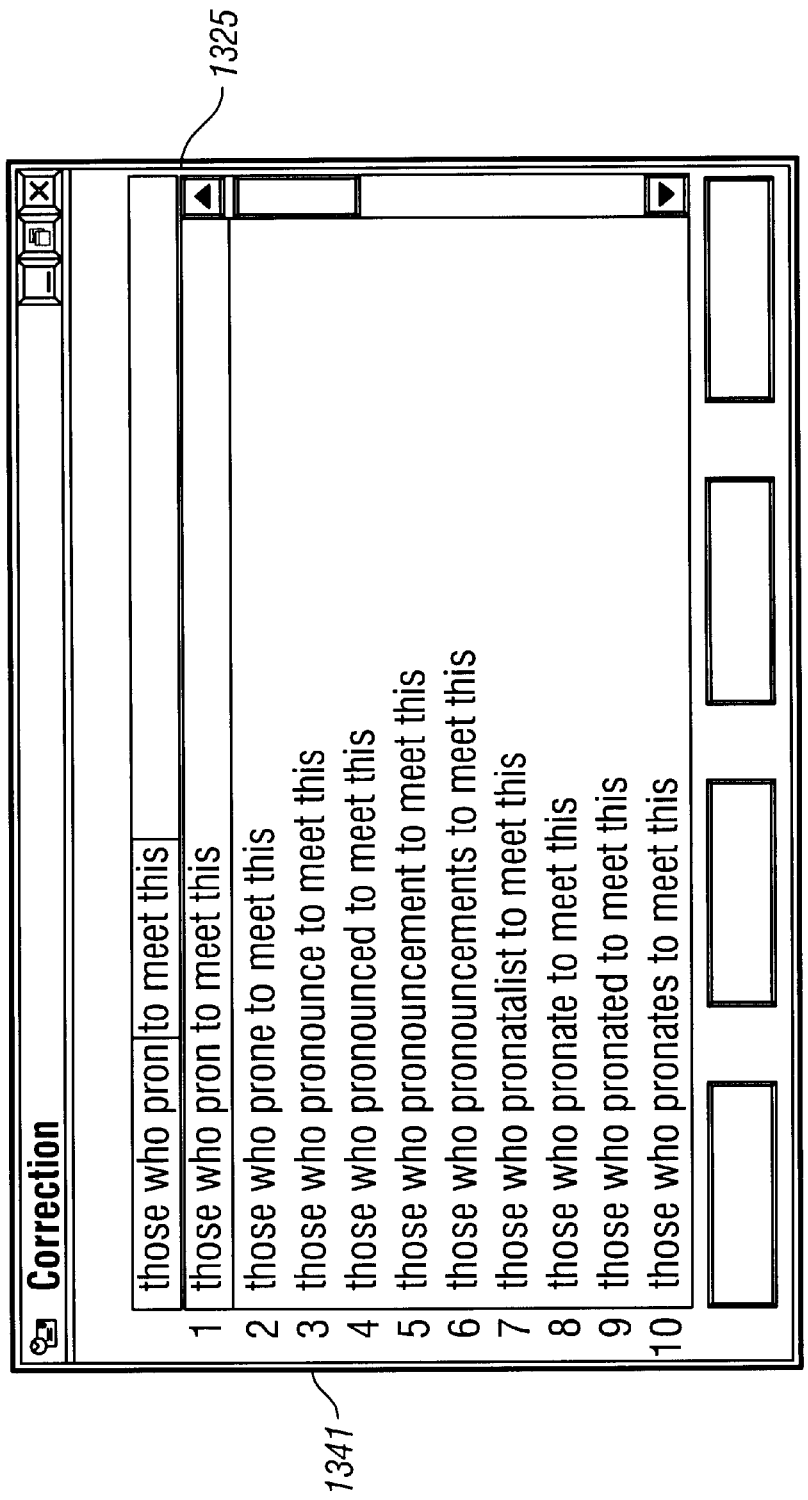

As shown in FIG. 13F, the user selects the word "Brown" 1335 using the mouse 110. As noted above, the user could also select the word "Brown" by using the voice command "Select Brown". As shown in FIG. 13G, the user then says "p r o n" 1340 to indicate that the word Brown should be replaced with a word starting with the letters "pron". The user could achieve the same result by typing the letters "pron". The control/interface module 220 responds by producing an updated list 1341 of recognition candidates, where each recognition candidate includes a word starting with "pron" in the position previously occupied by the word "Brown". Each of the recognition candidates includes the correctly-recognized words that preceded "Brown" ("those who") and the words that followed "Brown" ("to meet this").

Figure 13H:
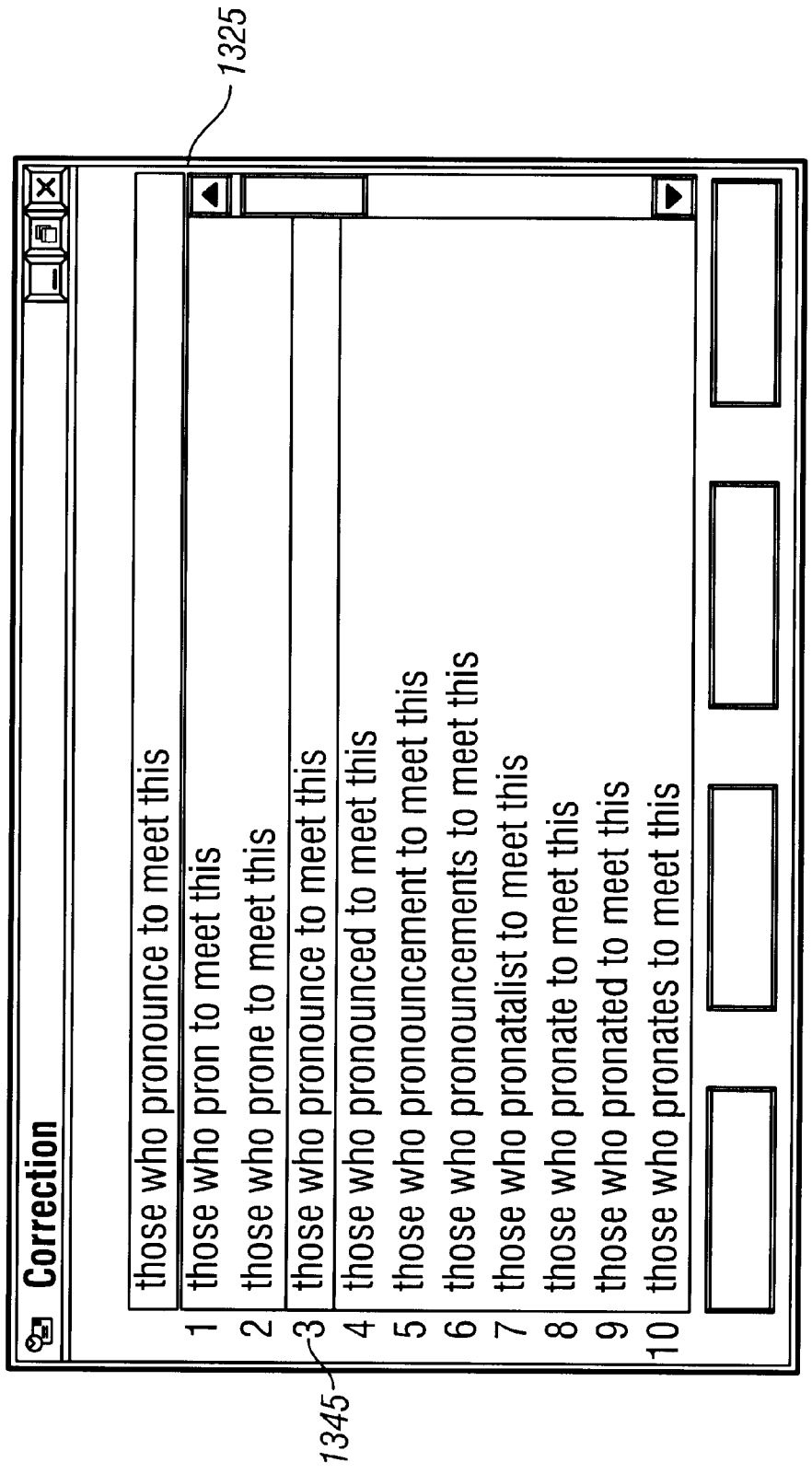

As shown in FIG. 13H, the user selects the recognition candidate 1345 that includes the word "pronounce" by using the mouse to select the third entry in the list. The user could achieve the same result by saying "Choose 3".

Figure 13I:
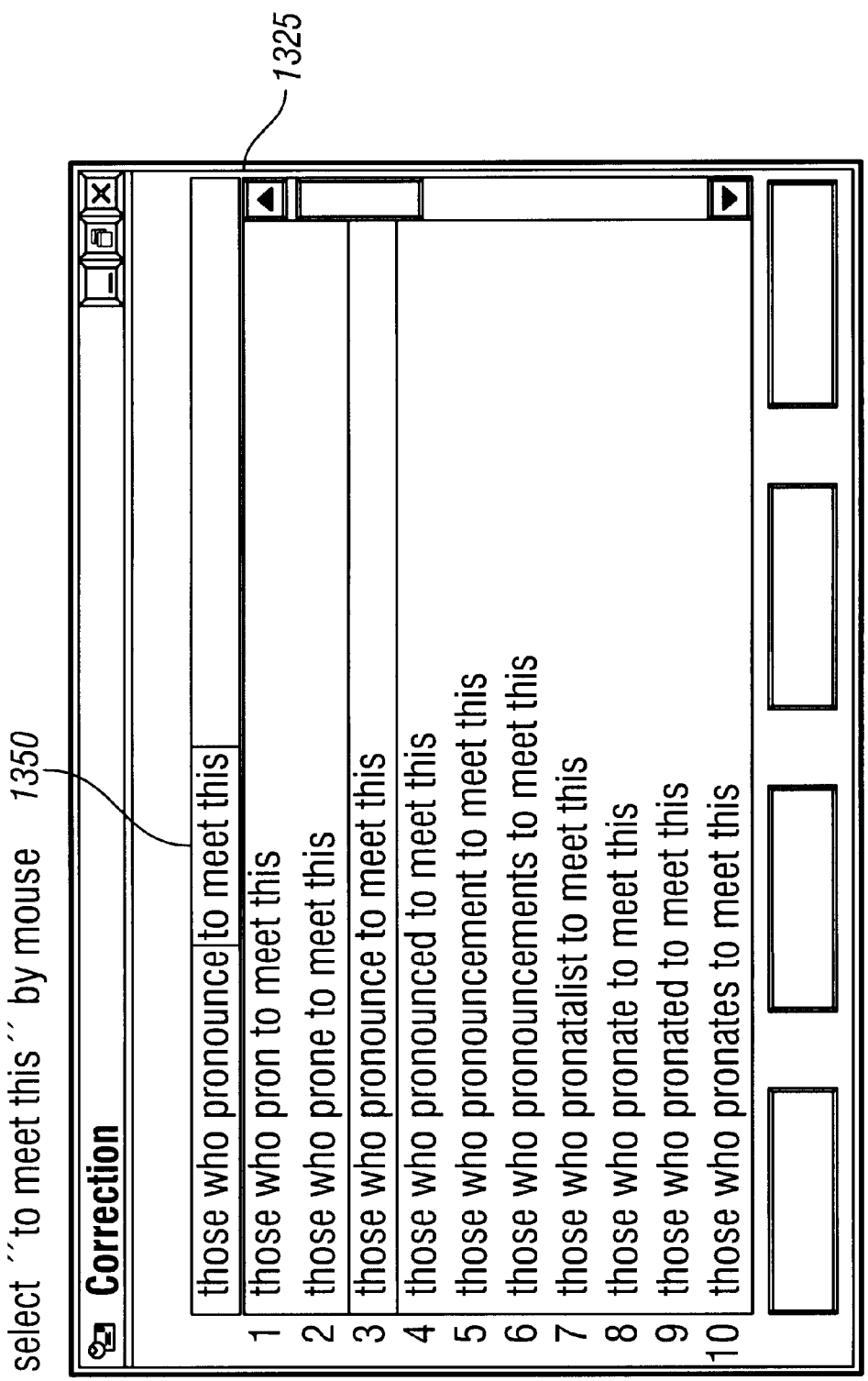
Figure 13J:
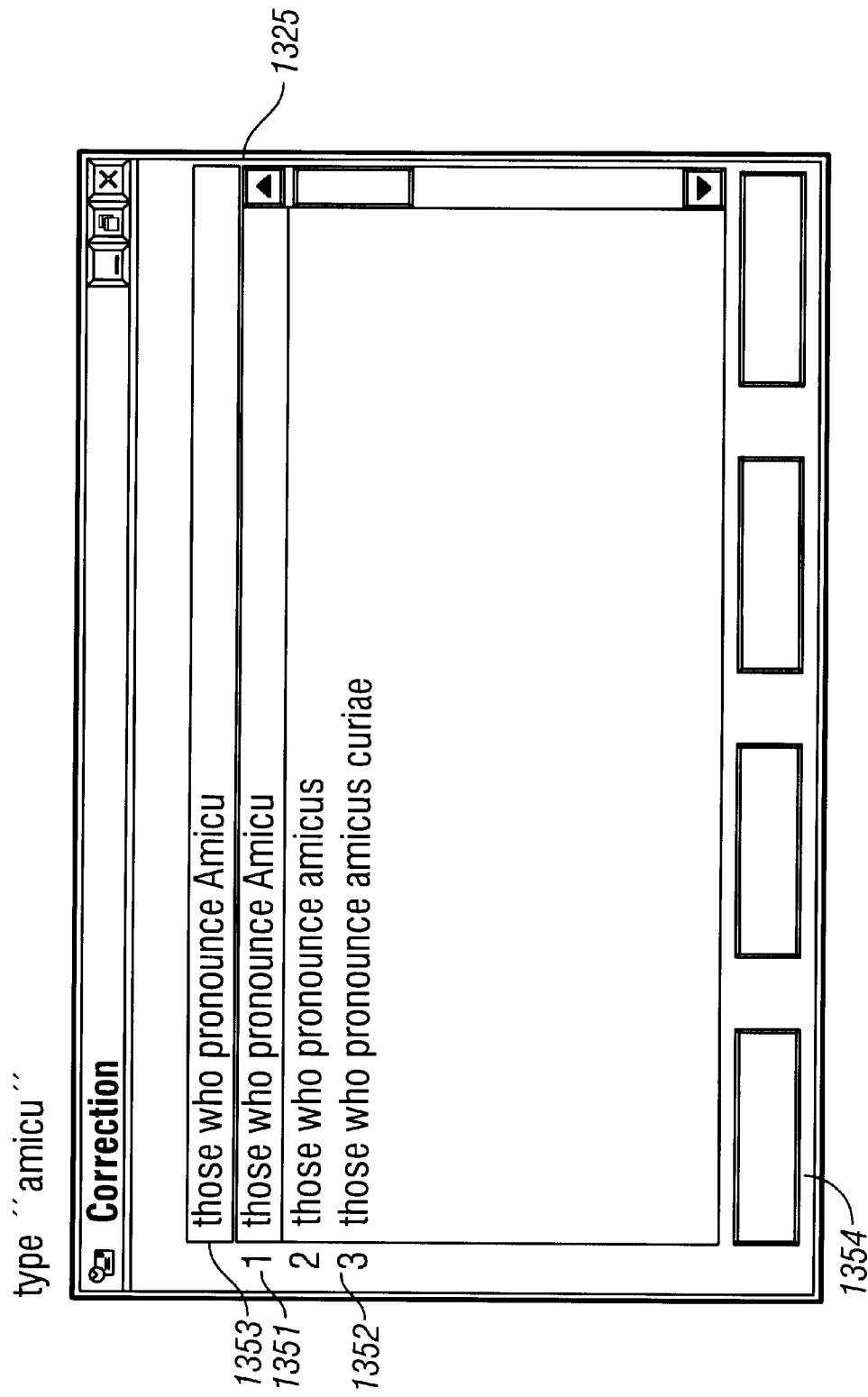
Figure 13K:
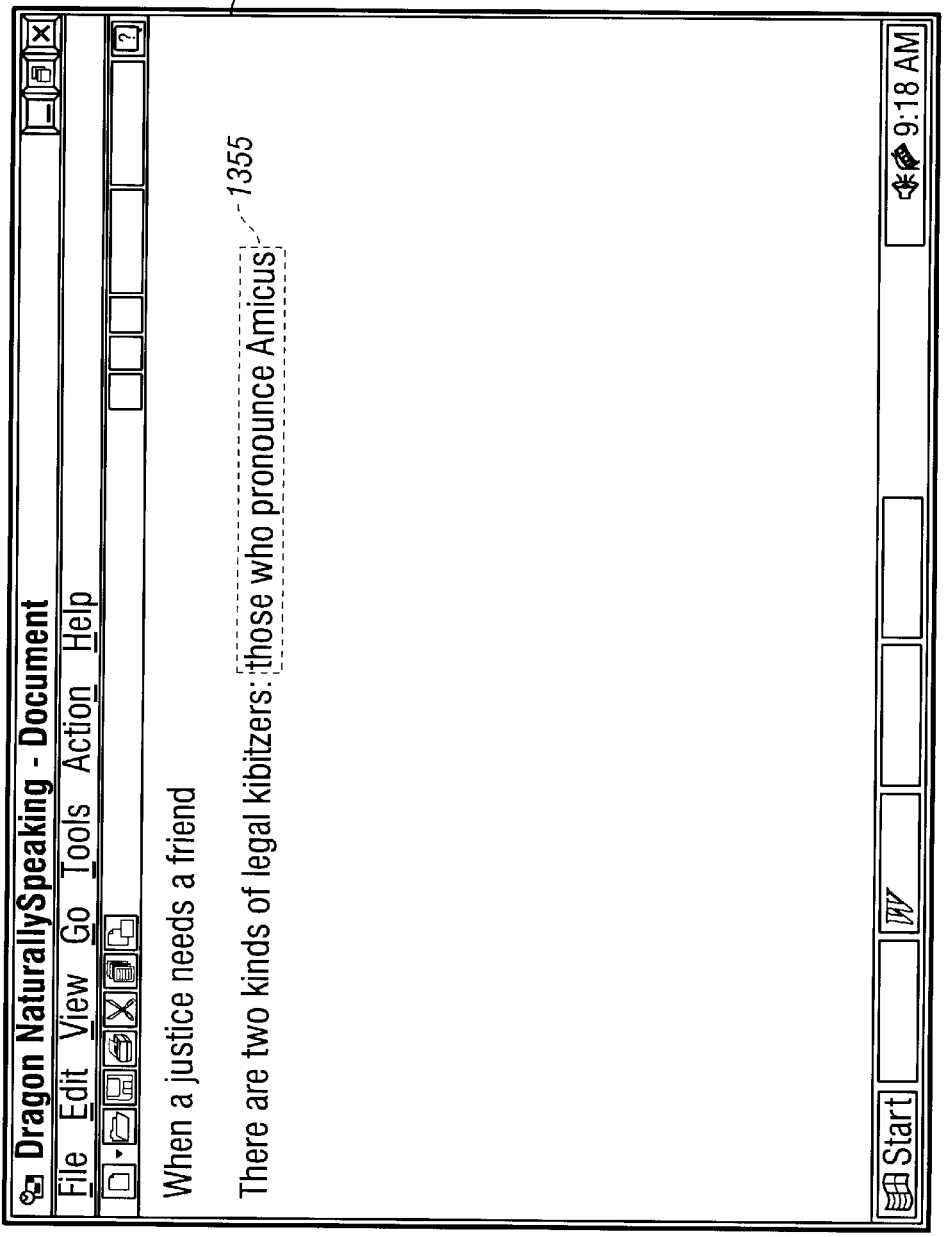

As shown in FIG. 13I, the user then uses the mouse to select the words "to meet this" 1350. Then, as shown in FIG. 13J, the user types the letters "amicu", and the control/interface module 220 responds by producing an updated list 1351 of recognition candidates that start with the words "those who pronounce" and include a word starting with the letters "amicu". An entry 1352 of the list includes a phrase "amicus curiae" that starts with the letters "amicu". Since the first entry 1353 is the correct entry, the user clicks on an "OK" button 1354 at the bottom of the correction dialog box 1325. As shown in FIG. 13K, the control/interface module 220 responds by placing the correct version 1355 of the utterance in the dictation window 1310. As discussed above, all of the correction steps for the utterance are performed within the same correction dialog box 1325.

Figure 13L:
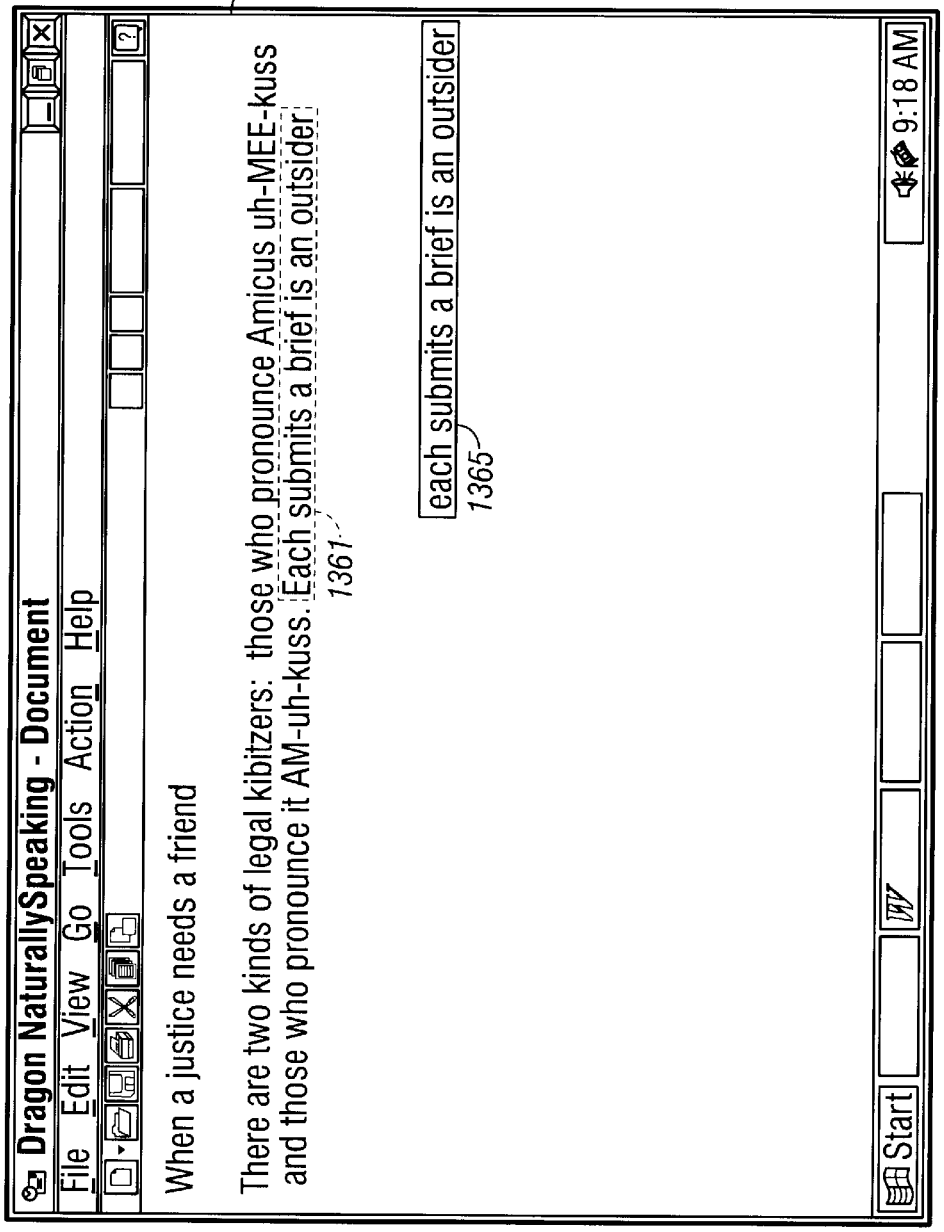
Figure 13M:
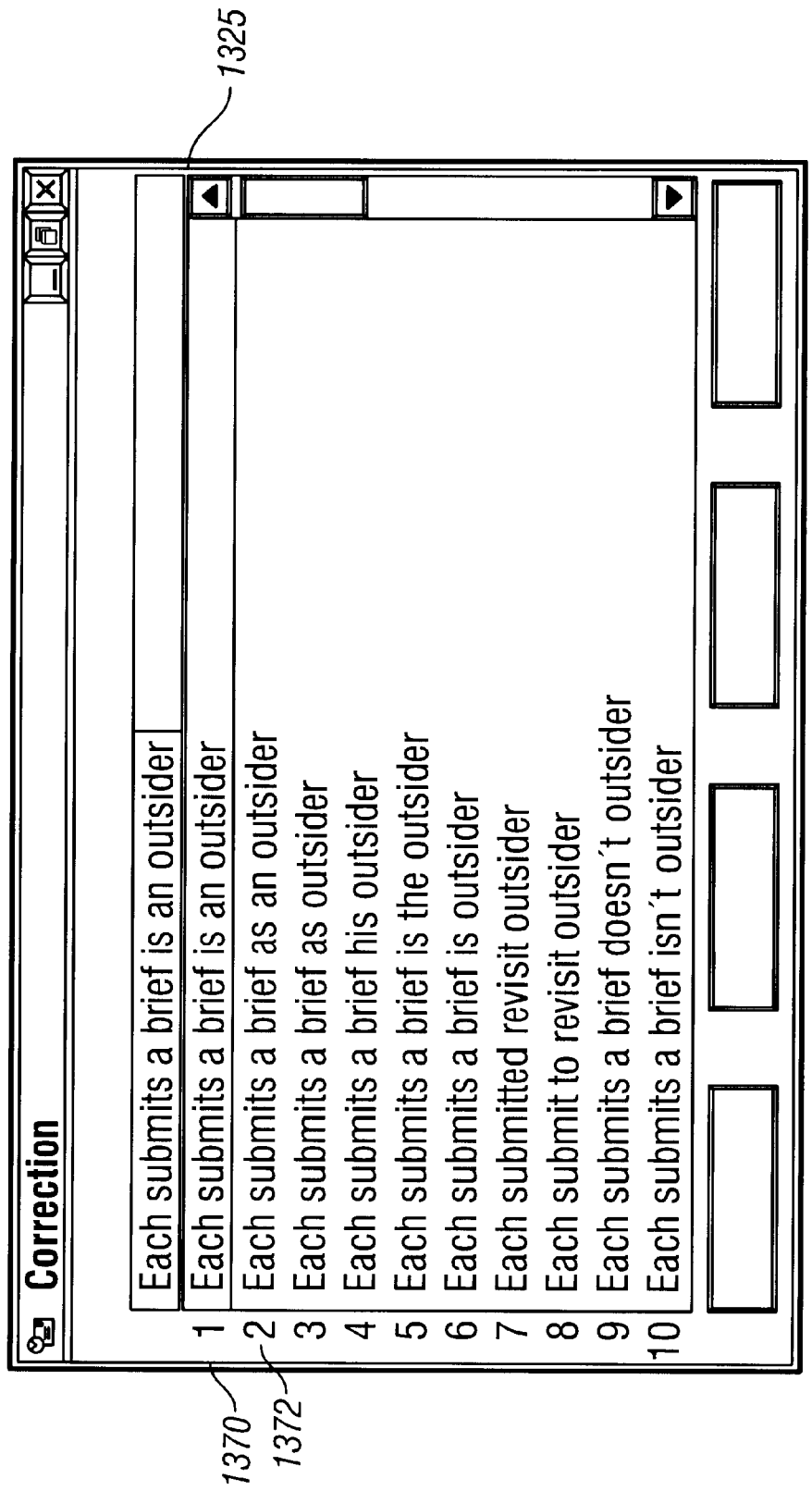
Figure 13N:
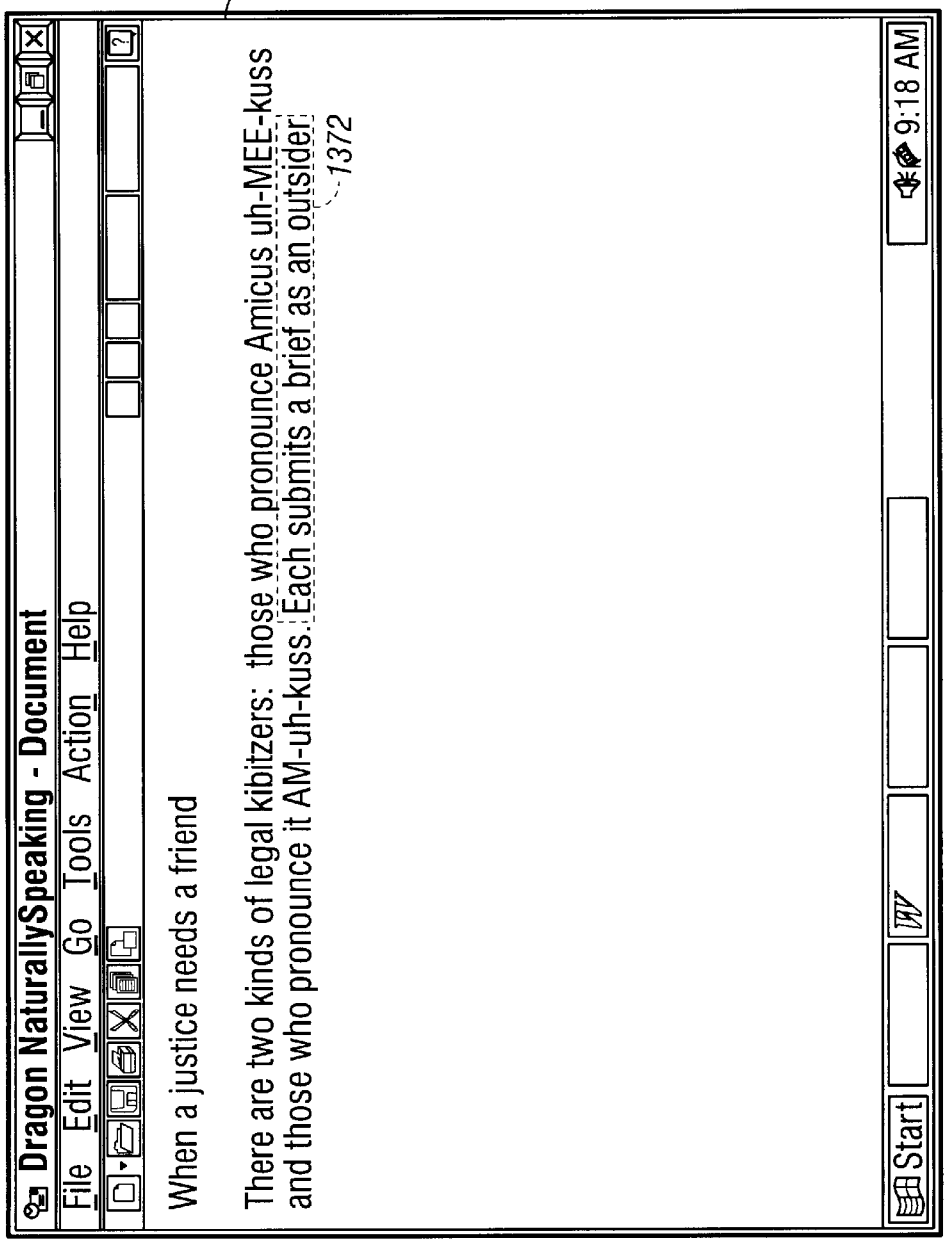

As shown in FIG. 13L, the recognizer 215 next misrecognizes an utterance 1360 ("Each submits a brief as an outsider") and the control/interface module 220 responds by inserting the incorrect text 1361 ("Each submits a brief is an outsider") in the dictation window 1310. FIG. 13L also illustrates another feature of the interface. As an utterance is being recognized, the control/interface module 220 may display a partial recognition candidate 1365 for the utterance. This partial candidate represents the best scoring hypotheses for the utterance at a point in time before the recognizer completes processing of the utterance. Display of the partial candidate is useful for long utterances that may require an extended time for processing. As shown in FIG. 13M, the user again causes the control/interface module 220 to generate the correction dialog box 1325 by saying the "Correct That" command 1331. The correction dialog box 1325 includes a list 1370 of recognition candidates for the entire utterance 1331. Since the text of the utterance 1360 appears as the second entry 1372 on the list 1370, the user selects the text by saying "Choose 2". As shown in FIG. 13N, the control/interface module 220 responds by placing the text 1372 in the dialog box 1310.

Figure 14A:
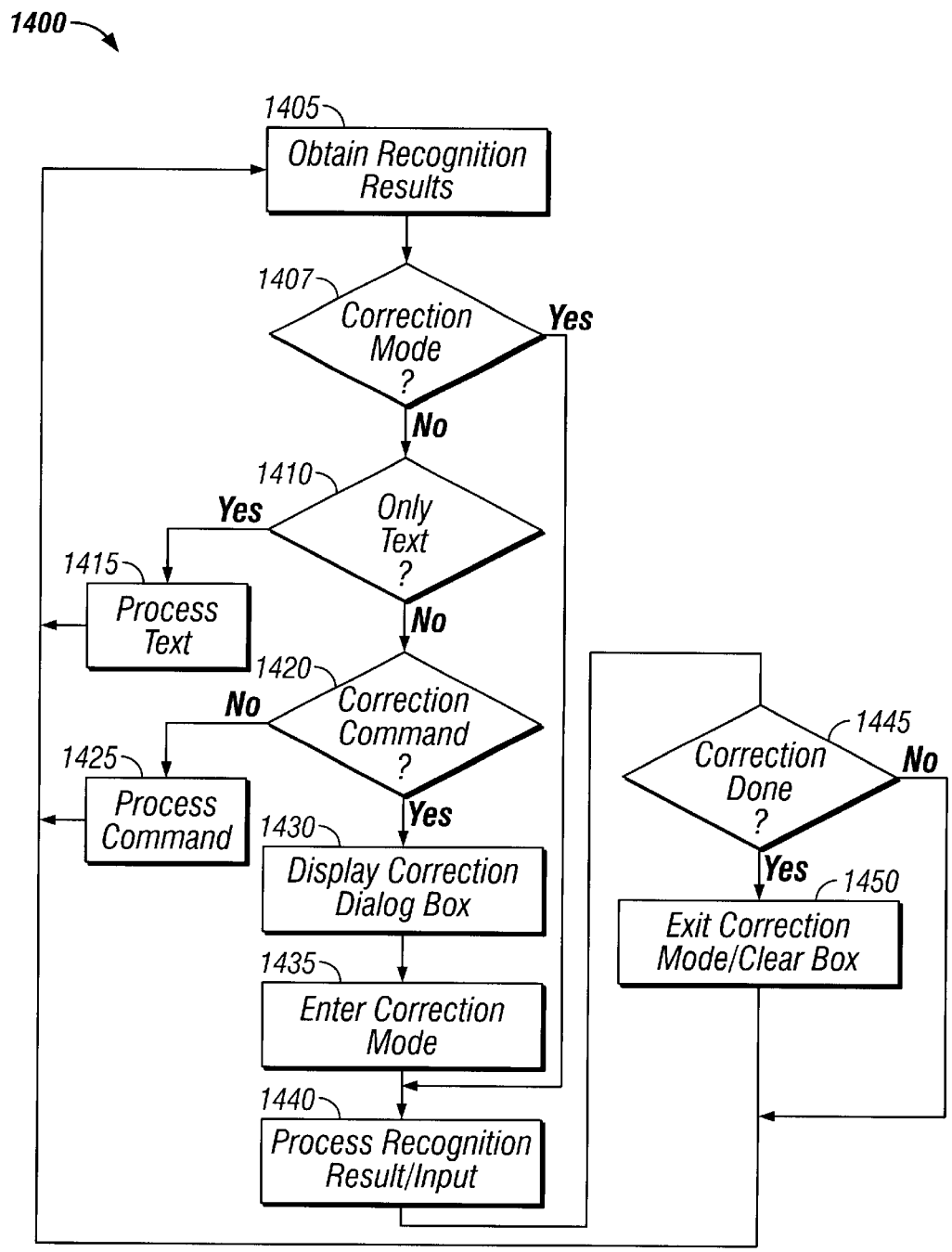
FIGS. 14A, 14B, and 15 are flow charts of procedures implemented by a control/interface module of the software of FIG. 2.

Referring to FIG. 14A, the control/interface module 220 may process recognition results according to a procedure 1400. Initially, the control/interface module 220 receives recognition results for an utterance from the recognizer 215 (step 1400). If the speech recognition software is not operating in correction mode (i.e., the correction dialog box 1325 is not displayed) (step 1405), the control/interface module determines whether the best-scoring recognition candidate includes only text (step 1410). If so, the control/interface module processes the text (step 1415). For example, the control/interface module may insert the text into a dictation window 1310.

If the best-scoring recognition candidate includes something other than text (step 1410), the control/interface module determines whether the candidate includes a correction command (step 1420). Correction commands activate the correction dialog box 1325 and include the "Select", "Spell That", and "Correct That" commands noted above, and an additional correction command, referred to as the "Make That" command.

If the best-scoring recognition candidate does not include a correction command (step 1420), the control/interface module processes any other command included in the best-scoring recognition candidate (step 1425). For example, as shown in FIG. 13A, if the best-scoring recognition candidate includes text and a formatting command such as New-Paragraph, then the control/interface module processes the text portion of the candidate and performs the formatting command.

If the best-scoring recognition candidate includes a correction command (step 1420), then the control/interface module displays the correction dialog box 1325 (step 1430) and enters the correction mode (step 1435).

Next, the control/interface module processes the best-scoring recognition candidate as a correction command (step 1440). The control/interface module also processes the best-scoring recognition candidate as a correction command if the software already is operating in the correction mode when the recognition results are received (i.e., the correction dialog box is already displayed).

In general, the control/interface module responds to correction commands by displaying a choice list in the correction dialog box 1325. For the "Correct That" command, if no portion of the best-scoring recognition candidate has been selected previously using the mouse 110, keyboard 115, or the "Select" command, the choice list includes the recognition candidates provided by the recognizer 215, with the candidates being ordered according to their associated scores. If a portion of the best-scoring recognition candidate has been selected previously, then the choice list includes versions of the original recognition candidate in which the selected portion varies. These versions of the original candidate may be generated by having the recognizer 215 perform a re-recognition of the utterance using a constraint grammar that only permits the selected portion of the original candidate to vary from the original candidate.

Similarly, for the "Spell That" command, if no portion of the original candidate has been selected previously, then the choice list includes only entries that begin with the letters following "Spell That" in the "Spell That" command. If a portion of the original candidate has been selected previously, then the choice list includes versions of the original candidate in which the selected portion starts with the letters provided in the "Spell That" command.

The "Make That" command includes the words "Make That" followed by one or more replacement words. If no portion of the original candidate has been selected previously, then the choice list includes entries corresponding to recognition of the replacement words, so that the entire original candidate is replaced with the replacement words. Alternatively, the software could identify automatically a portion of the original candidate to be replaced with the replacement words and list recognition candidates that include different versions of that portion. If a portion of the original candidate has been selected previously, then the choice list includes versions of the original candidate in which the selected portion has been replaced with different recognition candidates for the replacement words.

After processing the best-scoring recognition candidate (step 1440), the control/interface module determines whether the command included in the candidate has completed the correction session (step 1445). If so, the control/interface module exits the correction mode and removes the correction dialog box (step 1450). In either case, the control/interface module then waits for receipt of the next set of recognition candidates (step 1400). The control/interface module also waits for such receipt after processing a text-only candidate (step 1415) or a candidate that includes no correction commands (step 1425).

As noted above, the user may choose either to speak a correct word or words using the "Make That" command or to verbally spell a correct word or portion of a word using the "Spell That" command. When the user invokes the "Make That" command, the recognizer 215 performs speech recognition on the utterance that includes the command and returns the results in the form of a list of ordered groups of phonemes (i.e., recognition candidates). For example, the recognition candidate for "Make That Apple" could include the phonemes corresponding to "Make That a pull" while the second recognition candidate could include the phonemes corresponding to "Make That apple".

The control/interface module 220 may expand on the list of recognition candidates provided by the recognizer 215 by finding "confused pronunciation" matches for the phonemes following "Make That" in each of the recognition candidates. Confused pronunciation is based on the observation that phonemes having similar characteristics are commonly confused with one another. The control/interface module 220 then creates a list of words corresponding to the confused pronunciation results and uses those words to populate the choice list in the correction dialog box 1325.

The software 160 also may be configured so that the "Make That" and "Spell That" commands do not use a correction dialog box. When the software is so configured, the control/interface module replaces an utterance, a selected portion of the utterance, or an automatically determined portion of the utterance with the text portion of the best-scoring result of the "Make That" or "Spell That" commands. The control/interface module may perform the replacement by instructing the recognizer 215 to perform a re-recognition of the utterance using a constraint grammar that requires the results of the re-recognition to include an entry from the list.

When the user invokes the "Spell That" command, the recognizer 215 recognizes the spelling of the word in the context of a spelling constraint grammar that permits recognition of only letters. The recognition candidates provided by the recognizer 215 are in the form of a list of ordered groups of letters, with each group being a probable recognition result for the word or portion of a word spelled by the user. The control/interface module may then find "confused spelling" matches for the groups of letters in the list of results. The confused spelling match is similar to the confused pronunciation match, and is based on the observation that letters having similar pronunciation are often confused with one another. The results of the confused spelling match are then used in the same manner as the results of the confused pronunciation match to correct previously-misrecognized text.

Generally, the system performs the confused pronunciation or confused spelling matches by searching a dictionary. If the word used to correct the previously misrecognized word is absent from the active vocabulary, then the recognizer 215 could not have avoided misrecognizing the word during the original recognition. To avoid repetition of the misrecognition, the control/interface module "activates" the word from the backup dictionary by adding the word to the active vocabulary 230.

Figure 15:
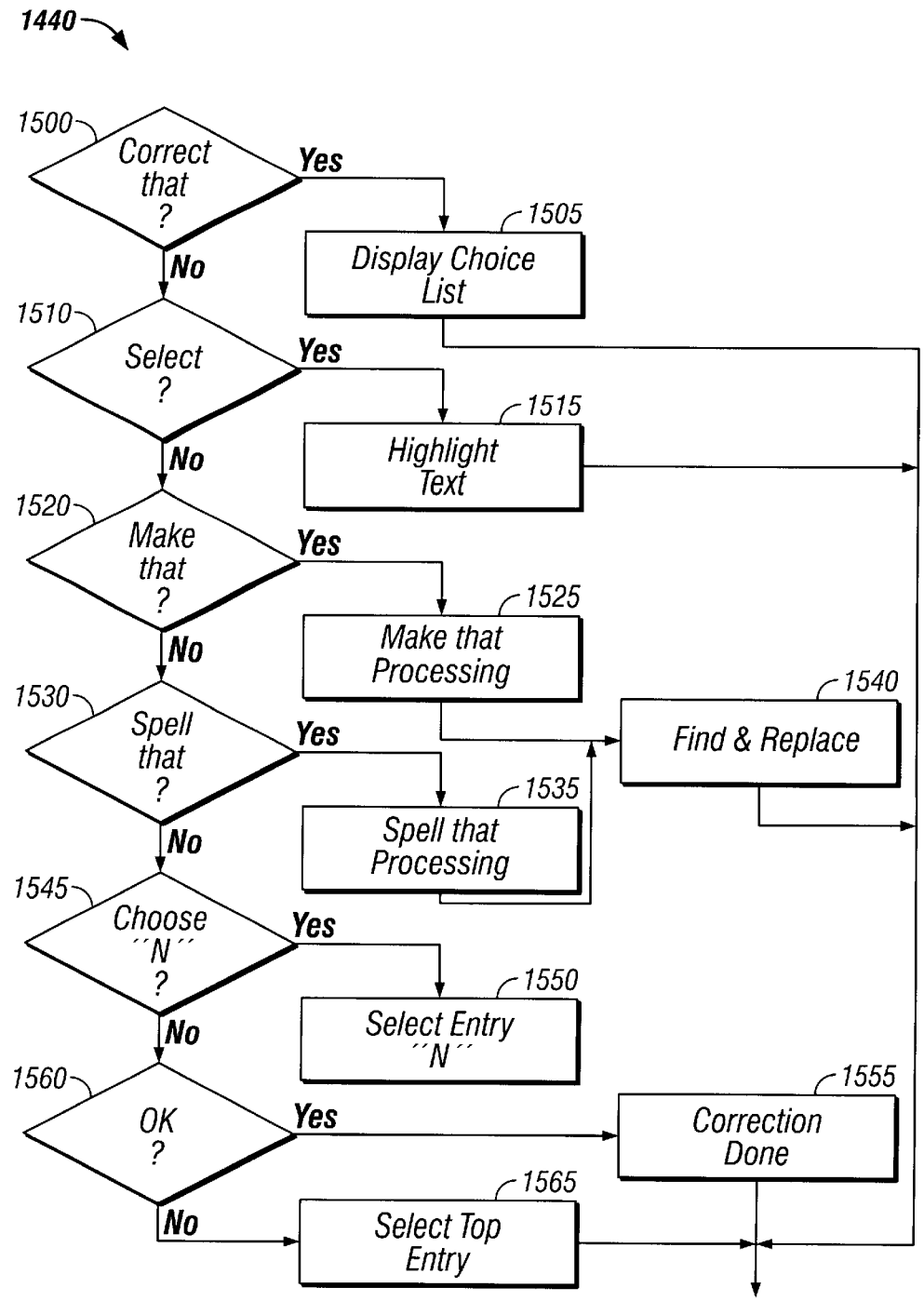

Referring to FIG. 15, the control/interface module 220 implements correction commands according to a procedure 1440. If the command corresponds to the "Correct That" command (step 1500), then the control/interface module displays a choice list as described above (step 1505).

If the command does not correspond to the "Correct That" command (step 1500), and instead corresponds to the "Select" command or a variation of that command (e.g., "Select [start] through [end]") (step 1510), then the control/interface module finds and highlights the word or words identified by the select command (step 1515). Thus, for the basic "Select" command, the module highlights the word or words following "Select". Similarly, for the "Select [start] through [end]" command, the module highlights the block of text starting with the word corresponding to "[start]" and ending with the word corresponding to "[end]". These words are identified by the recognizer 215 through implementation of the constraint grammar corresponding to the expanded "Select" command, which may be expressed as:

<recognition result>::=Select
        [<words>] |
        [<words> Through <words>·{ordered}] |
        [From <words> To <words> {ordered}] |
        [From <words> Through <words> {ordered}] |
        [That]|
        [Again],
where
    <words>::=[PRW$^1$[PRW$^2$[PRW$^3$ . . . PRW$^n$]]] |
    [PRW$^2$[PRW$^3$ . . . PRW$^n$]] |. . .[PRW$^n$], and
    "PRW$^i$" is the previously-recognized word i.

In general, the command considers all of the previously-recognized words that are displayed on the display 120.

The illustrated constraint grammar provides for a "Select [word(s)]" command, a "Select [start] Through [end]" command, a "Select From [start] To [end]" command, a "Select From [start] Through [end]" command, a "Select That" command, and a "Select Again" command. Other variations also could be provided.

The notation {ordered} indicates that words in the first instance of <words> in the command appear in the text before words in the second instance of <words>. Use of {ordered} in the constraint grammar provides considerable processing savings relative to an approach that requires the second instance of <words> to differ depending upon the words included in the first instance. The {ordered} operator may be implemented by permitting both instances of <words> to include any words from the previously-recognized text, and throwing out any hypotheses that include out-of-order results (i.e., results in which the "starting" word actually follows the "ending" word of the block to be selected. Thus, the constraint grammar employs positional information to eliminate nonsensical results.

The "Select That" command provides for a quick and efficient way to select and highlight the user's previous utterance. In particular, the control/interface module highlights the words corresponding to the previous utterance in response to the "Select That" command.

The "Select Again" command provides for a quick and efficient way to select a particular instance of a word when a word appears multiple times in a passage. For example, if the word "speech" had occurred three times in the text displayed on the screen, and the system had highlighted the first occurrence (or a passage beginning or ending with the first occurrence), the user could move to the next occurrence by saying "Select Again". User-selectable parameters may be used to designate whether the select commands look for word occurrences located before or after the cursor position.

In generating hypotheses that correspond to the select command, the recognizer 215 may be configured to score homophones equally. Thus, if the displayed text included the word "triphones" and the phrase "try phones", the recognizer would use the score of the best scoring of the two elements in generating hypotheses that include each of the two elements.

The constraint grammar for <words> may be updated incrementally as the displayed text changes. For example, as text scrolls off the top of the display and new text is added at the bottom, the removed text may be eliminated from the beginning of the grammar while the new text is added to the end of the grammar.

Selecting a portion of previously-recognized results is discussed further in U.S. application Ser. No. 08/556,280, entitled "CONTINUOUS SPEECH RECOGNITION" and filed Nov. 13, 1995, which is incorporated by reference. The results of the "Select" command also may be achieved by using the mouse 110 or keyboard 115 to select a desired portion of the utterance.

If the command does not correspond to the "Correct That" command (step 1500) or the "Select" command (step 1510), the control/interface module determines whether the command corresponds to the "Make That" command (step 1520). The recognizer 215 identifies the "Make That" command using a constraint grammar similar to the constraint grammar for the "Select" command. In particular, the constraint grammar requires the words "make that" to be followed by one or more words from the recognition vocabulary. This constraint grammar may be expressed as:

<recognition result>::=Make That <phonemes>,
where
    <phonemes>::=<phonemes> <phoneme>
and
    <phoneme> is any valid phoneme.

If the user has invoked the "Make That" command (step 1520), the control/interface module performs a MAKETHAT correction procedure (step 1525). Operation of the MAKETHAT correction procedure is described further in U.S. application Ser. No. 08/825,534, entitled "ERROR CORRECTION IN SPEECH RECOGNITION" and filed Mar. 28, 1997, which is incorporated by reference.

If the command does not correspond to the "Correct That" command (step 1500), the "Select" command (step 1510), or the "Make That" command (step 1520), the control/interface module determines whether the command corresponds to the "Spell That" command (step 1530). The recognizer 215 identifies the "Spell That" command using the following constraint grammar:

<recognition result>::=Spell That <letters>,
where
    <letters>::=<letters> <letter>
and
    <letter> is any letter of the alphabet.

If the user has invoked the "Spell That" command (step 1530), the control/interface module performs the SPELLTHAT correction procedure (step 1535). Operation of the SPELLTHAT correction procedure is described further in U.S. application Ser. No. 08/825,534. From the dialog box, the user also may invoke the "Spell That" command by typing or speaking a series of letters.

Following performing one of the MAKETHAT (step 1525) or SPELLTHAT (step 1535) correction procedures, the control/interface module performs a procedure identified as FIND&REPLACE (step 1540). This procedure replaces some of the previously-recognized text with text produced by the MAKETHAT or SPELLTHAT correction procedures. Briefly, if a portion of an utterance has been selected using the "Select" command or other means, the control/interface module 220 instructs the recognizer 215 to perform a re-recognition to replace the selected word or words. If no selection has been made, then the control/interface module either replaces the entire utterance with text produced by the MAKETHAT or SPELLTHAT correction procedures, or re-recognizes speech frames for the previously-recognized words to replace a word or words in the previous recognition results. Operation of the FIND&REPLACE procedure is described further in U.S. application Ser. No. 08/825,534.

If the correction command is the "Choose N" command (step 1545), the control/interface module selects entry "N" from the list displayed in the correction dialog box 1325 (step 1550) and indicates that correction is done (step 1555). If the correction command is "OK" or some other affirmative response (step 1560), then the control/interface module selects the top entry in the correction dialog box 1325 (step 1565) and indicates that correction is done (step 1555).

Figure 14B:
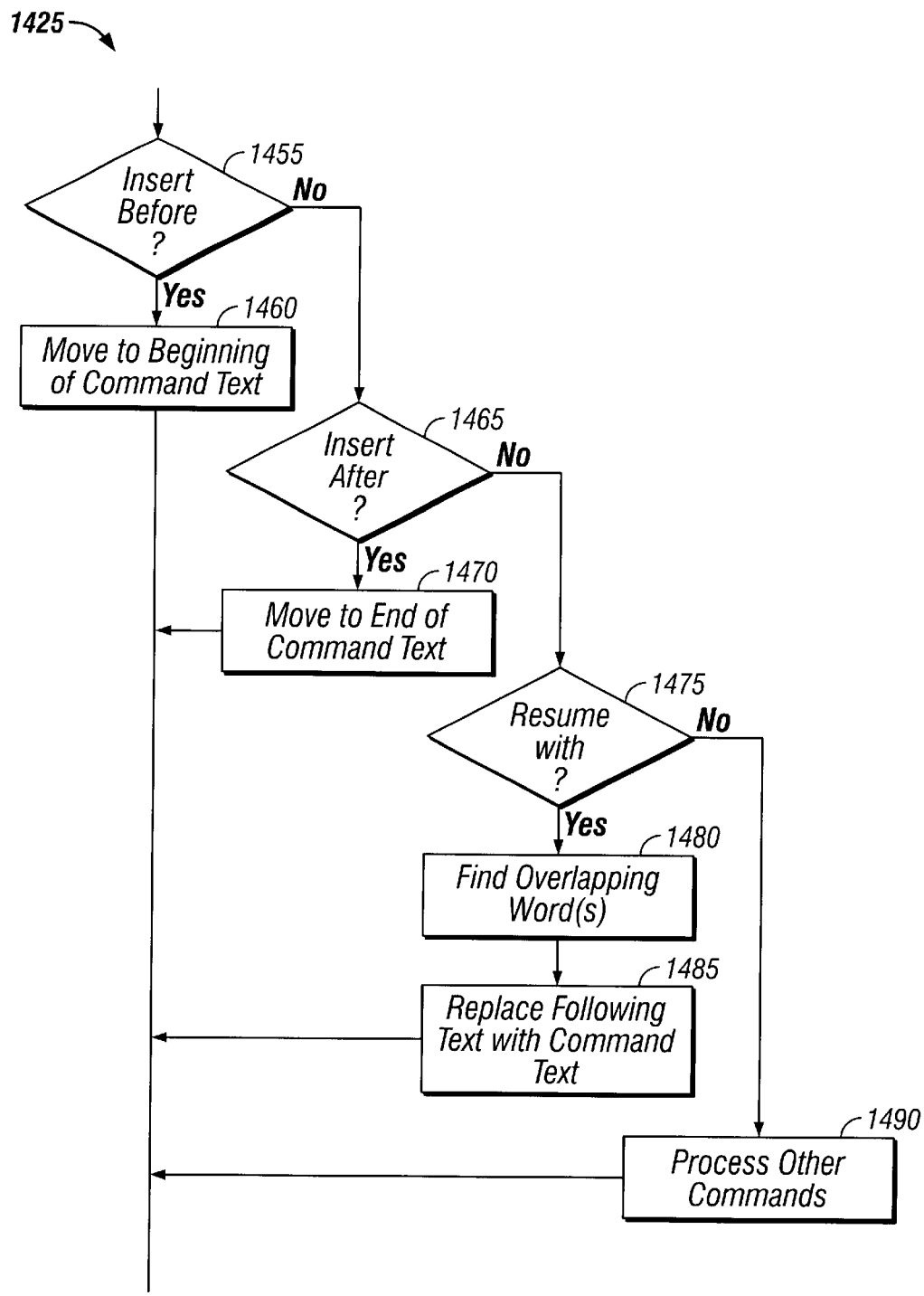

FIG. 14B illustrates a procedure used by the control/interface module to perform cursor/position manipulation commands and other commands included in the best-scoring recognition candidate (step 1425). Particular commands illustrated in FIG. 14B include an "Insert Before" command, an "Insert After" command, and a "Resume With" command.

If the command is an "Insert Before" command (step 1455), the module moves the cursor/action position to a position preceding the text identified in the command (step 1460). Similarly, if the command is an "Insert After" command (step 1465), the module moves the cursor/action position to a position following the text identified in the command (step 1470).

The "Insert Before/After" commands provide a simple way for the user to move to a desired position in the text. The recognizer 215 identifies these commands using an "Insert" constraint grammar, which may be expressed as:

<recognition result>::=Insert
    [Before <words>] |
    [After <words>] |
    [Before That] |
    [After That],
where
    <words>::=[PRW$^1$[PRW$^2$[PRW$^3$ ... PRW$^n$]]] |
    [PRW$^2$[PRW$^3$ ... PRW$^n$]] |... [PRW$^n$], and
    "PRW$^i$" is the previously-recognized word i.

The "Insert Before That" and "Insert After That" commands provide quick and efficient ways to move to the beginning or end of the user's previous utterance or to a previous selection by the user. When the user has not previously selected text, the control/interface module responds to this command by moving the cursor/action position to a location before or after the previous utterance, as appropriate. Thus, if a user neglected to put a word at a beginning of an utterance, the user could say "Insert Before That" to move to the beginning of the utterance. After speaking the missing word, the user could say "Insert After That" to move back to the end of the utterance.

When the user has previously selected text, the control interface module responds to the "Insert Before/After That" command by moving the cursor/action position to a location before or after the selection. Thus, the user could select a passage by saying for example, "Select [start] Through [end]", and could then move to the beginning of the passage by saying "Insert Before That".

If the command is a "Resume With" command (step 1475), the module finds in the text the word or words identified by the command and overlapping the text (step 1480) and replaces any following text with the word or words identified in the command (step 1485). Thus, if the user had said "Today, I saw a giraffe at the zoo" followed by "Resume With saw an elephant at the circus", the module would cause the system to display "Today, I saw an elephant at the circus". In this example, "saw" would be the overlapping word.

Similarly, if the user had said "Today, I saw a giraffe at the zoo PERIOD" followed by "The giraffe had a long neck PERIOD" followed by "Resume With saw an elephant at the circus", the module would cause the system to display "Today, I saw an elephant at the circus". Thus, most of the first sentence and all of the second sentence of the original dictation would be overwritten by the text in the "Resume With" command. As also shown, the "Resume with" command may be used to overwrite multiple utterances. In some implementations, the user is required to pause before reciting the "Resume With" command. This is not required in other implementations.

The "Resume With" command does not rely on the presentation of information on the display. For that reason, the command is particularly useful when the user records speech using a portable recording device, such as an analog or digital recorder, and subsequently transfers the recorded speech to the speech recognition system for processing. In that context, the "Resume With" command provides the user with a simple and efficient way of redirecting the dictation and eliminating erroneously-spoken words.

The recognizer 215 identifies the "Resume With" command using a "Resume With" constraint grammar, which may be expressed as:

$$\langle\text{recognition result}\rangle ::= \text{Resume With } \langle\text{words}\rangle$$
$$[\langle\text{newwords}\rangle]$$

where

<words>::=[PRW$^1$[PRW$^2$[PRW$^3$ ... PRW$^n$]]] |
[PRW$^2$[PRW$^3$ ... PRW$^n$]] |... [PRW$^n$)],
"PRW$^i$" is the previously-recognized word i, and
<newwords>::=any word or sequence of words from the active vocabulary.

If the command is not an "Insert" command or a "Resume With" command, the module processes the command accordingly (step 1490).

Other embodiments are within the scope of the following claims. For example, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of manipulating an action position in computer-implemented speech recognition, comprising:

receiving data representing a spoken command, the command including a command identifier and a designation of at least one previously-spoken word;

performing speech recognition on the data to identify the command identifier and the designation; and establishing an action position measured from a position of the at least one previously-spoken word based on the command identifier;

wherein the designation comprises the at least one previously-spoken word.

2. The method of claim 1, wherein the command identifier indicates that the action position is to be before the position of the at least one previously-spoken word, and establishing the action position comprises establishing the action position immediately prior to the position of the at least one previously-spoken word.

3. The method of claim 2, wherein the command identifier comprises "insert before".

4. The method of claim 1, where in the command identifier indicates that the action position is to be after the position of the at least one previously-spoken word, and establishing the action position comprises establishing the action position immediately after the position of the at least one previously-spoken word.

5. The method of claim 4, wherein the command identifier comprises "insert after".

6. The method of claim 1, wherein the designation comprises at least one new word, the method further comprising replacing any words following the at least one previously-spoken word with the at least one new word.

7. The method of claim 6, wherein establishing the action position comprises establishing the action position after the position of the at least one new word.

8. The method of claim 6, wherein the command identifier comprises "resume with".

9. The method of claim 6, wherein receiving data comprises receiving data generated by recording the spoken command using a recording device physically separate from a computer implementing the speech recognition.

10. The method of claim 9, wherein the recording device comprises a digital recording device, and receiving data comprises receiving a file from the digital recording device.

11. The method of claim 9, wherein receiving data comprises receiving signals generated by playing back the spoken command using the recording device.

12. The method of claim 11, wherein the recording device comprises an analog recording device.

13. The method of claim 1, wherein receiving data comprises receiving data generated by recording the spoken command using a recording device physically separate from a computer implementing the speech recognition.

14. The method of claim 13, wherein the recording device comprises a digital recording device, and receiving data comprises receiving a file from the digital recording device.

15. The method of claim 13, wherein receiving data comprises receiving signals generated by playing back the spoken command using the recording device.

16. The method of claim 15, wherein the recording device comprises an analog recording device.

17. A method of selecting a block of text in computer-implemented speech recognition, comprising:

receiving data representing a spoken selection command, the command including a command identifier and a text block identifier identifying a block of previously-recognized text, wherein at least one word included in the block of text is not included in the text block identifier;

performing speech recognition on the data to identify the command identifier and the text block identifier; and selecting the block of text corresponding to the text block identifiers;

wherein the text block identifier includes at least a first previously-recognized word of the block of text and at least a last previously-recognized word of the block of text.

18. The method of claim 17, wherein the command identifier comprises "select" and the text block identifier comprises the first previously-recognized word of the block of text, "through", and the last previously-recognized word of the block of text.

19. The method of claim 17, wherein performing speech recognition on the data comprises performing speech recognition using a constraint grammar.

20. The method of claim 19, wherein the constraint grammar permits the block of text to start with any word in a set of previously-recognized words and to end with any word in the set of previously-recognized words.

21. The method of claim 20, wherein the set of previously-recognized words comprises previously-recognized words displayed on a display device when the selection command is spoken.

22. The method of claim 20, wherein performing speech recognition comprises generating multiple candidates for the text block identifier and further comprises eliminating candidates for which the block of text starts with a previously-recognized word spoken after a previously-recognized word with which the block of text ends.

23. The method of claim 22, wherein performing speech recognition comprises associating a score with each of the multiple candidates.

24. The method of claim 23, wherein a score for a candidate is based on scores for components of the candidate.

25. The method of claim 24, further comprising, when components of different candidates are homophones, adjusting the scores for the candidates so that the portion of each score attributable to one of the homophones equals the score of the best-scoring one of the homophones.

26. A method of selecting a block of text in computer-implemented speech recognition, comprising:

receiving data representing a spoken selection command, the command including a command identifier and a text block identifier identifying a block of previously-recognized text, wherein at least one word included in the block of text is not included in the text block identifier;

performing speech recognition on the data to identify the command identifier and the text block identifier; and selecting the block of text corresponding to the text block identifier, wherein the text block identifier designates a previously-recognized utterance without using words included in the utterance.

27. The method of claim 26, wherein the text block identifier comprises "that".

28. The method of claim 26, wherein the command identifier consists of "select" and the text block identifier consists of "that" so that the spoken selection command consists of "select that".

29. Computer software, residing on a computer-readable storage medium, comprising instructions for causing a computer to:

receive data representing a spoken command, the command including a command identifier and a designation of at least one previously-spoken word;

perform speech recognition on the data to identify the command identifier and the designation; and establish an action position measured from a position of the at least one previously-spoken word based on the command identifier;

wherein the designation comprises the at least one previously-spoken word.

30. A speech recognition system, comprising:

an input device for receiving speech signals; and a processor configured to:

receive data representing a spoken command, the command including a command identifier and a designation of at least one previously-spoken word;

perform speech recognition on the data to identify the command identifier and the designation; and establish an action position measured from a position of the at least one previously-spoken word based on the command identifier;

wherein the designation comprises the at least one previously-spoken word.

31. Computer software, residing on a computer-readable storage medium, comprising instructions for causing a computer to:

receive data representing a spoken selection command, the command including a command identifier and a text block identifier identifying a block of previously-recognized text, wherein at least one word included in the block of text is not included in the text block identifier;

perform speech recognition on the data to identify the command identifier and the text block identifier; and select the block of text corresponding to the text block identifiers;

wherein the text block identifier includes at least a first previously-recognized word of the block of text and at least a last previously-recognized word of the block of text.

32. A speech recognition system, comprising:

an input device for receiving speech signals; and a processor configured to:

receive data representing a spoken selection command, the command including a command identifier and a text block identifier identifying a block of previously-recognized text, wherein at least one word included in the block of text is not included in the text block identifier;

perform speech recognition on the data to identify the command identifier and the text block identifier; and select the block of text corresponding to the text block identifiers wherein the text block identifier includes at least a first previously-recognized word of the block of text and at least a last previously-recognized word of the block of text.

33. A computer-based method for use in working with text, comprising:

receiving a command including an utterance designating a portion of the text, performing speech recognition on the utterance to identify the portion of the text, and establishing an action position in the text;

wherein:
the action position is measured from a position of the identified portion of the text and is determined by the command, and
the utterance comprises the portion of text.

34. A method of manipulating an action position in computer-implemented speech recognition, comprising:
receiving data representing a spoken command, the command including a command identifier and a designation of at least one previously-spoken word;
performing speech recognition on the data to identify the command identifier and the designation;
establishing a position measured from the at least one previously-spoken word based on the command identifier; and
performing an action at the established position, the action including inserting at least one word;
wherein the designation is independent of a number of words between the at least one previously-spoken word and the established position.

35. The method of claim 34, wherein the designation comprises a designation term that represents a multi-word utterance.

36. The method of claim 35, wherein the designation term comprises "that" and the multi-word utterance comprises an utterance spoken and recognized immediately prior to the spoken command.

37. Computer software, residing on a computer-readable storage medium, comprising instructions for causing a computer to:
receive data representing a spoken command, the command including a command identifier and a designation of at least one previously-spoken word;
perform speech recognition on the data to identify the command identifier and the designation;
establish a position measured from the at least one previously-spoken word based on the command identifier; and
perform an action at the established position, the action including inserting at least one word;
wherein the designation is independent of a number of words between the at least one previously-spoken word and the established position.

38. A speech recognition system, comprising:
an input device for receiving speech signals; and
a processor configured to:
receive data representing a spoken command, the command including a command identifier and a designation of at least one previously-spoken word;
perform speech recognition on the data to identify the command identifier and the designation;
establish a position measured from the at least one previously-spoken word based on the command identifier; and
perform an action at the established position, the action including inserting at least one word;
wherein the designation is independent of a number of words between the at least one previously-spoken word and the established position.

39. A computer-based method for use in working with text, comprising:
receiving a command including an utterance designating a portion of the text,
performing speech recognition on the utterance to identify the portion of the text, and
establishing a position in the text, the position being measured from the identified portion of the text and determined by the command;
performing an action at the established position, the action including inserting at least one word;
wherein the utterance designating the portion of text is independent of a number of words between the portion of text and the established position.

* * * * *